US012562628B2

(12) United States Patent
Witt

(10) Patent No.: US 12,562,628 B2
(45) Date of Patent: Feb. 24, 2026

(54) METHOD FOR PRODUCING A WINDING FOR A STATOR IN AN ELECTRIC ROTATING MACHINE, STATOR, METHOD FOR PRODUCING THE STATOR AND ELECTRIC ROTATING MACHINE

(71) Applicant: Schaeffler Technologies AG & Co. KG, Herzogenaurach (DE)

(72) Inventor: Holger Witt, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 256 days.

(21) Appl. No.: 18/030,401

(22) PCT Filed: Sep. 28, 2021

(86) PCT No.: PCT/DE2021/100783
§ 371 (c)(1),
(2) Date: Apr. 5, 2023

(87) PCT Pub. No.: WO2022/073545
PCT Pub. Date: Apr. 14, 2022

(65) Prior Publication Data
US 2023/0378856 A1 Nov. 23, 2023

(30) Foreign Application Priority Data

Oct. 7, 2020 (DE) .......................... 102020126245.0

(51) Int. Cl.
*H02K 15/08* (2006.01)
*H02K 1/16* (2006.01)
(Continued)

(52) U.S. Cl.
CPC ............. *H02K 15/085* (2013.01); *H02K 1/16* (2013.01); *H02K 3/12* (2013.01); *H02K 15/026* (2013.01)

(58) Field of Classification Search
CPC .. H02K 3/28; H02K 3/12; H02K 3/00; H02K 15/00; H02K 15/15; H02K 15/16
(Continued)

(56) References Cited

U.S. PATENT DOCUMENTS 6,137,203 A * 10/2000 Jermakian ............ H02K 21/026
310/191
6,348,751 B1 2/2002 Jermakian et al.
(Continued)

FOREIGN PATENT DOCUMENTS

WO 2019166061 A1 9/2019

*Primary Examiner* — Maged M Almawri
(74) *Attorney, Agent, or Firm* — Volpe Koenig

(57) ABSTRACT

A method for producing a winding for a stator, the stator itself, a method for producing the stator and an electric rotating machine.

The method for producing a winding for a stator of an electric rotating machine provides a first conductor and a further conductor, wherein the two conductors are bent into a zigzag form, at least in length portions, and the further conductor is moved with respect to the first conductor in a combination movement, which has a translatory movement component along the longitudinal axis of the further conductor and a rotary movement component about the longitudinal axis of the further conductor, such that the further conductor winds around an extreme value axis of the first conductor, which runs through regions f the first conductor, said regions forming extreme values of the zigzag course. The method for producing a winding for the stator, and the stator itself, the method for producing the stator and the electric rotating machine provide solutions that permit the winding, and accordingly also the stator comprising the winding and the electric rotating machine comprising the stator, to be produced at low cost and with little effort.

5 Claims, 22 Drawing Sheets

(51) Int. Cl.

| | |
|---|---|
| *H02K 3/12* | (2006.01) |
| *H02K 15/026* | (2025.01) |
| *H02K 15/085* | (2006.01) |

(58) Field of Classification Search
USPC .......... 310/201, 179, 208, 203, 202; 29/596, 29/606, 603.23–603.23
See application file for complete search history.

(56) References Cited

U.S. PATENT DOCUMENTS

| | | | | | |
|---|---|---|---|---|---|
| 7,652,406 | B2* | 1/2010 | Kim | .................... | H02K 1/18 |
| | | | | | 310/43 |
| 7,888,904 | B2* | 2/2011 | Mularcik | .............. | H02K 16/04 |
| | | | | | 318/720 |
| 8,013,482 | B2* | 9/2011 | Kurokawa | ............ | H02K 9/197 |
| | | | | | 310/58 |
| 8,772,996 | B2* | 7/2014 | Utaka | .................... | H02K 3/12 |
| | | | | | 310/201 |
| 9,742,227 | B2* | 8/2017 | Klassen | ................ | B25J 9/126 |
| 9,912,203 | B2* | 3/2018 | Lucchi | ............... | H02K 15/022 |
| 10,141,805 | B2* | 11/2018 | Sromin | ............... | H02K 16/02 |
| 10,574,110 | B2* | 2/2020 | Long | .................... | H02K 3/28 |
| 11,128,188 | B2* | 9/2021 | Klassen | ................ | H02K 1/22 |
| 12,160,149 | B2* | 12/2024 | Lines | ................... | H02K 1/2798 |
| 12,348,099 | B2* | 7/2025 | Morris | .................. | H02K 3/12 |
| 2003/0011253 | A1* | 1/2003 | Kalsi | .................... | H02K 1/20 |
| | | | | | 310/58 |
| 2003/0189388 | A1* | 10/2003 | Hashimoto | ........... | H02K 16/00 |
| | | | | | 310/268 |
| 2005/0035672 | A1* | 2/2005 | Ward | .................. | B60L 3/0061 |
| | | | | | 310/156.37 |
| 2007/0040465 | A1* | 2/2007 | Al-Khayat | .............. | H02K 3/28 |
| | | | | | 310/216.106 |
| 2008/0272666 | A1* | 11/2008 | Halstead | ............... | H02K 21/24 |
| | | | | | 310/156.32 |
| 2009/0260217 | A1* | 10/2009 | Kamakura | ........ | H02K 15/0433 |
| | | | | | 310/207 |
| 2010/0117481 | A1* | 5/2010 | Greaves | ................ | H02K 21/24 |
| | | | | | 29/596 |
| 2011/0012472 | A1* | 1/2011 | Umeda | .................... | H02K 3/28 |
| | | | | | 310/207 |
| 2011/0221287 | A1* | 9/2011 | Lucchi | .................... | H02K 3/24 |
| | | | | | 310/54 |
| 2012/0007462 | A1* | 1/2012 | Kouda | .................... | H02K 3/12 |
| | | | | | 310/206 |
| 2012/0217836 | A1 | 8/2012 | Atsushi | | |
| 2013/0169102 | A1* | 7/2013 | Fukushige | .............. | H02K 3/28 |
| | | | | | 310/198 |
| 2013/0181555 | A1* | 7/2013 | Okamura | ................ | H02K 3/12 |
| | | | | | 310/59 |
| 2014/0015367 | A1* | 1/2014 | Umehara | ............ | H02K 15/067 |
| | | | | | 29/596 |
| 2014/0070646 | A1* | 3/2014 | Isoda | ...................... | H02K 3/50 |
| | | | | | 310/71 |
| 2014/0111055 | A1* | 4/2014 | Chamberlin | ............ | H02K 3/12 |
| | | | | | 72/46 |
| 2014/0300239 | A1* | 10/2014 | Takizawa | .............. | H02K 15/10 |
| | | | | | 29/596 |
| 2015/0015110 | A1* | 1/2015 | Kaimori | ................. | H02K 3/12 |
| | | | | | 310/201 |
| 2015/0357889 | A1 | 12/2015 | Kazuya | | |
| 2016/0211718 | A1* | 7/2016 | Lucchi | .................... | H02K 9/19 |
| 2018/0212489 | A1* | 7/2018 | Schuler | .............. | H02K 1/2798 |
| 2019/0252930 | A1 | 8/2019 | Stetina et al. | | |
| 2023/0006485 | A1* | 1/2023 | Witt | ...................... | H02K 1/182 |

* cited by examiner

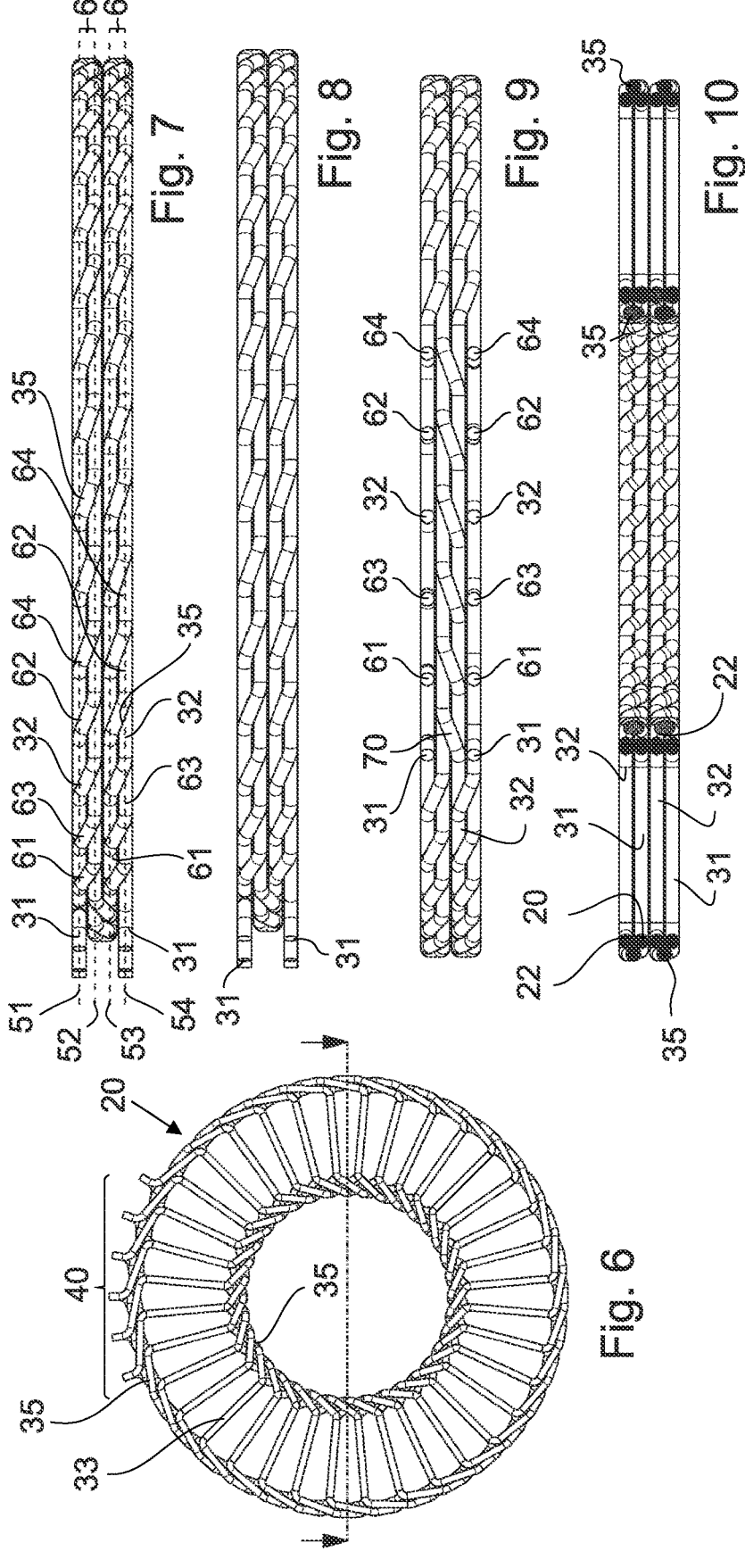

120

120

METHOD FOR PRODUCING A WINDING FOR A STATOR IN AN ELECTRIC ROTATING MACHINE, STATOR, METHOD FOR PRODUCING THE STATOR AND ELECTRIC ROTATING MACHINE

CROSS-REFERENCE TO RELATED APPLICATIONS

This application is the U.S. National Phase of PCT Appln. No. PCT/DE2021/100783, filed Sep. 28, 2021, which claims the benefit of German Patent Appln. No. 102020126245.0, filed Oct. 7, 2020, the entire disclosures of which are incorporated by reference herein.

TECHNICAL FIELD

The disclosure relates to a method for producing a winding for a stator of an electric rotating machine, the stator itself, a method for producing the stator, and an electric rotating machine.

BACKGROUND

The electric drive train of motor vehicles is known from the prior art. This consists of components for energy storage, energy conversion, and energy transmission. Energy conversion components include radial flux machines and axial flux machines.

However, radial flux machines often only have one operating point at which they have the best efficiency. Accordingly, they are not designed to adjust the operating point as a function of the changing requirements placed thereon and thereby achieve the highest efficiency in accordance with the different requirements of the different operating parameters or at different operating points.

To overcome this disadvantage, electric rotating machines that are adapted to the requirements which arise in terms of their operating range are often used, or the disadvantage mentioned is compensated for by coupling the electric rotating machine to a gear unit or by integrating a gear unit into the electric rotating machine, such as with an electric axis.

Various designs of axial flux machines with one or more stators and one or more rotors are known from the prior art.

An electric axial flux machine, also referred to as a transverse flux machine, is a motor or generator in which the magnetic flux between a rotor and a stator is realized parallel to the axis of rotation of the rotor. Other designations for electric axial flux machines are also brushless DC motors, permanently excited synchronous motors, or disc motors.

Such an axial flux machine can be designed in designs that differ in the arrangement of the rotor and/or stator, and can be realized with different special features and advantages when used, for example as a traction machine for a vehicle.

Axial flux machines exist with various winding forms. A common form of winding is the single-tooth winding. Although single-tooth windings form small winding heads, they generate a magnetic field with a high proportion of harmonics, i.e., waves with a different frequency than the number of revolutions of the rotor of the axial flux machine, which negatively influences the acoustics and the efficiency. Axial flux machines with distributed windings have the advantage that the aforementioned disadvantages do not occur, or only to a reduced extent. However, the winding heads of these distributed windings require a large amount of space in the axial and/or radial direction.

Large winding heads are not desirable, especially in axial flow machines, since they limit the maximum diameter of the active components in the event of radial expansion, which reduces the maximum torque that can be made available. A relatively large axial extension of the winding heads results in a larger axial length of the entire electric rotating machine, which is also undesired.

To explain the state of the art, specific embodiments are discussed below.

U.S. Pat. No. 6,348,751 B1 discloses an electric motor with active hysteresis control of winding currents and/or with an efficient stator winding arrangement and/or an adjustable air gap to form an axial flux machine. A stator of this electric motor comprises a plurality of stator teeth in a plurality of segments, which are entwined in a serpentine manner with corresponding segments of windings, which are implemented in a plurality of planes. Each phase occupies a respective peripheral region of the stator.

US 2003/0189388 A1 discloses an assembly that has an axial flow machine that includes a stator and a rotor. The stator has a plurality of axially aligned stator teeth which are separated from one another by grooves. Windings of a stator winding run around the stator teeth. It can be seen that the winding heads have a relatively large volume requirement in the axial and/or radial direction.

US 2019/0252930 A1 relates to a stator assembly for an axial flux machine and an axial flux machine having such a stator assembly. The stator assembly comprises a stator having a plurality of stator teeth which are distributed concentrically in the circumferential direction and are arranged to be separated in the axial direction from a rotor by an air gap, wherein the stator teeth comprise two end sections opposite in the axial direction and a tooth core between the end sections, and wherein each tooth core has core cross-sectional area and is wrapped with at least one coil winding. Corresponding single-tooth windings are provided here.

In the case of the windings used, the individual windings are often interwoven with one another, so that bending the individual conductors separately and then bringing them together in a braid requires a great deal of machinery and time. This applies in particular to windings in which a conductor is routed in more than two planes.

SUMMARY

Proceeding therefrom, the present disclosure is based on the object of providing a method for producing a winding for a stator of an electric rotating machine, the stator itself, a method for producing the stator and providing an electric rotating machine which enable the winding, and accordingly also to produce the stator having the winding and the electric rotating machine comprising the stator at low cost and with little effort.

This object is achieved by the method for producing a winding for a stator disclosed herein, by the stator of an electric rotating machine disclosed herein, by the method for producing the stator according disclosed herein and by the electric rotating machine disclosed herein.

Advantageous embodiments of the method according to the disclosure for producing a winding are disclosed. An advantageous embodiment of the electric rotating machine is also disclosed.

The features of the claims can be combined in any technically useful manner, wherein the explanations from the following description as well as features from the figures can also be consulted for this purpose, which comprise supplementary embodiments of the disclosure.

The disclosure relates to a method for producing a winding for a stator of an electric rotating machine, in which a first conductor and a further conductor are provided, the two conductors are each bent into a zigzag shape, at least lengthwise in sections, and the further conductor in a combination movement is moved in relation to the first conductor, which has a translatory movement component along the longitudinal axis of the further conductor and a rotary movement component around the longitudinal axis of the further conductor, so that the further conductor winds around an extreme value axis of the first conductor, which runs through regions of the first conductor, forming the extreme values of the zigzag course.

This creates a braid that has meshes, similar to a chain link fence. In particular, the method is used to produce a winding for a stator of an axial flow machine. In this case, the longitudinal axis of the further conductor corresponds to an ideal axis which extends along the longitudinal direction and essentially in the middle of the zigzag-shaped further conductor. If the zigzag course is equated with an oscillation, the pointed corner regions of the zigzag form correspond to minima and maxima of the oscillation and thus to the extreme values. A respective conductor is organized to be connected to a phase. Along the general winding direction, one of the conductors can thus be organized for connection to a first phase and the respective further conductor for connection to a further phase, starting from the common connection region.

This process can be repeated with further additional conductors to provide a braid of conductors which, when a 3-phase winding is implemented, are organized to be connected to the phases in the following sequence U+, V+, W+, U−, V−, W−. The first conductor is then organized to be connected to U+.

Any additional further conductors are braided into the already connected, braided conductors.

The method for producing the winding can be realized in particular in such a way that the zigzag shape is three-dimensional, wherein the zigzag shape is equated with a harmonic oscillation, and linear conductor sections of the conductor in question which have a positive slope and linear conductor sections of the conductor in question which have a negative slope, are arranged on both sides outside of a central plane running through the regions of the extreme values.

Correspondingly, a respective conductor forms a three-dimensional spiral or a screw thread shape, with angular regions in the extreme values. These regions in the extreme values can also be referred to as connecting conductor pieces.

The linear sections are connected to each other by regions of the respective conductor that form the extreme values. These regions forming the extreme values are the regions of the conductor in question which, when the winding produced is later arranged on a stator body and running in grooves between stator teeth, encompass the stator teeth on the radial inside thereof or one of the radial outsides thereof, and consequently linear conductor sections to be arranged in grooves of a stator body connect the conductors together.

The linear sections, together with the connecting conductor pieces, form a respective enlacing of at least one stator tooth.

An advantageous embodiment provides that the zigzag shape is implemented in such a way that linear conductor sections of the relevant conductor are aligned to be parallel to one another. Alternatively or additionally, provision is made for a first spacing and a second spacing to be formed alternately between adjacent linear sections, wherein the first spacing is greater than the second spacing.

As a result, it can be achieved that connection regions between the respective adjacent linear sections, which are also referred to as connecting conductor pieces, are arranged on one longitudinal side of the braid produced, are longer than connection regions or connecting conductor pieces arranged on the opposite longitudinal side of the braid produced.

When the essentially strip-shaped braid is bent into a circular shape, the longer connection regions or the longer connecting conductor pieces can be arranged on the radial outside of the circular shape, and the shorter connection regions or the shorter connecting conductor pieces are arranged on the radial inside of the circular shape. This facilitates bending in a circular shape and, moreover, it is achieved that the linear portions of the windings are already arranged to substantially correspond to the positions of the grooves in the stator body.

After winding the conductors around one another, the braid produced therewith can be reduced in thickness perpendicular to the juxtaposition of the meshes produced. In other words, the braid produced is pressed flat to reduce the axial extent thereof when arranged between stator teeth of an axial flux machine. During this pressing flat, the regions of the respective conductor that form the extreme values and are also referred to as connecting conductor pieces are pressed together, so that the braid has a smaller thickness, particularly in these sections.

Furthermore, after the conductors are wound around, the braid produced therewith can be bent so that it runs in a circular shape. This bending of the braid produced can be carried out before or after the reduction in thickness.

According to a further aspect, the disclosure relates to a stator of an electric rotating machine, comprising a stator body which has a plurality of stator teeth arranged along a circumferential direction, and grooves formed between the stator teeth, as well as conductor sections of a winding produced according to the method according to the disclosure arranged in grooves. The conductors of the winding are assigned to different electrical phases. At least one conductor section of at least one conductor of only one respective phase is arranged in a respective groove.

This means that the conductor sections of the conductors of different phases do not share a groove. The sequence of arrangement of the parallel conductor portions in each groove through which the conductors pass alternates along the circumferential direction. In this case, the conductors meander, deviating from a winding direction that basically runs in the circumferential direction, in a direction that runs essentially perpendicular to the circumferential direction in the radial direction, and with a respective enlacing formed, thereby enlace a group of stator teeth.

The vertical direction can also be understood to mean a direction of 60°-120° in relation to an ideal tangent to the circumferential direction. In addition, the course in this direction can also be curved or designed with at least one slight kink.

The stator is in particular a stator of an axial flow machine. In some embodiments, the stator body can also be referred to as a stator yoke, on which a plurality of axially protruding stator teeth are arranged.

A further aspect of the present disclosure is a method for producing a stator of an electric rotating machine according to the disclosure, in which a stator body having a plurality of stator teeth arranged along a circumferential direction and grooves formed between the stator teeth, and a winding produced according to the method according to the disclosure are provided. The conductors of the winding are assigned to different electrical phases or prepared for connection to different phases, such as three phases. At least one conductor section of at least one conductor of only one respective phase is arranged in the grooves, so that the conductors form at least a proportion of windings of the stator. The sequence of arrangement of the parallel conductor portions in each groove through which the conductors pass alternates along the circumferential direction. The conductors are arranged in such a way that, deviating from a winding direction generally running in the circumferential direction, they meander in a direction running essentially perpendicular to the circumferential direction in the radial direction, and each one enlaces a group of stator teeth with a respective enlacing formed thereby.

Here, too, the vertical direction can also be understood to mean a direction of 60°-120° in relation to an ideal tangent to the circumferential direction. In addition, the course in this direction can also be curved or designed with at least one slight kink.

Furthermore, the disclosure provides an electric rotating machine which has a rotor and at least one stator according to the disclosure.

In particular, this electric rotating machine is designed as an axial flow machine.

In particular, it is provided that the conductors of the phases are connected in a star connection to corresponding contacts carrying current of the relevant phase.

BRIEF DESCRIPTION OF THE DRAWINGS

The disclosure described above is explained in detail below against the relevant technical background with reference to the accompanying drawings, which show preferred embodiments. The disclosure is not limited in any way by the purely schematic drawings, wherein it should be noted that the embodiments shown in the drawings are not limited to the dimensions shown. In the drawings:

FIG. 6: shows a winding in a front view;

FIG. 7: shows a first side view of the winding;

FIG. 8: shows a second side view of the winding;

FIG. 9: shows a third side view of the winding;

FIG. 10: Shows a sectional view along the line of section indicated in FIG. 6;

DETAILED DESCRIPTION

First, the general design of a stator according to the disclosure is explained with reference to FIGS. 1 and 2.

Figures 1, 2:
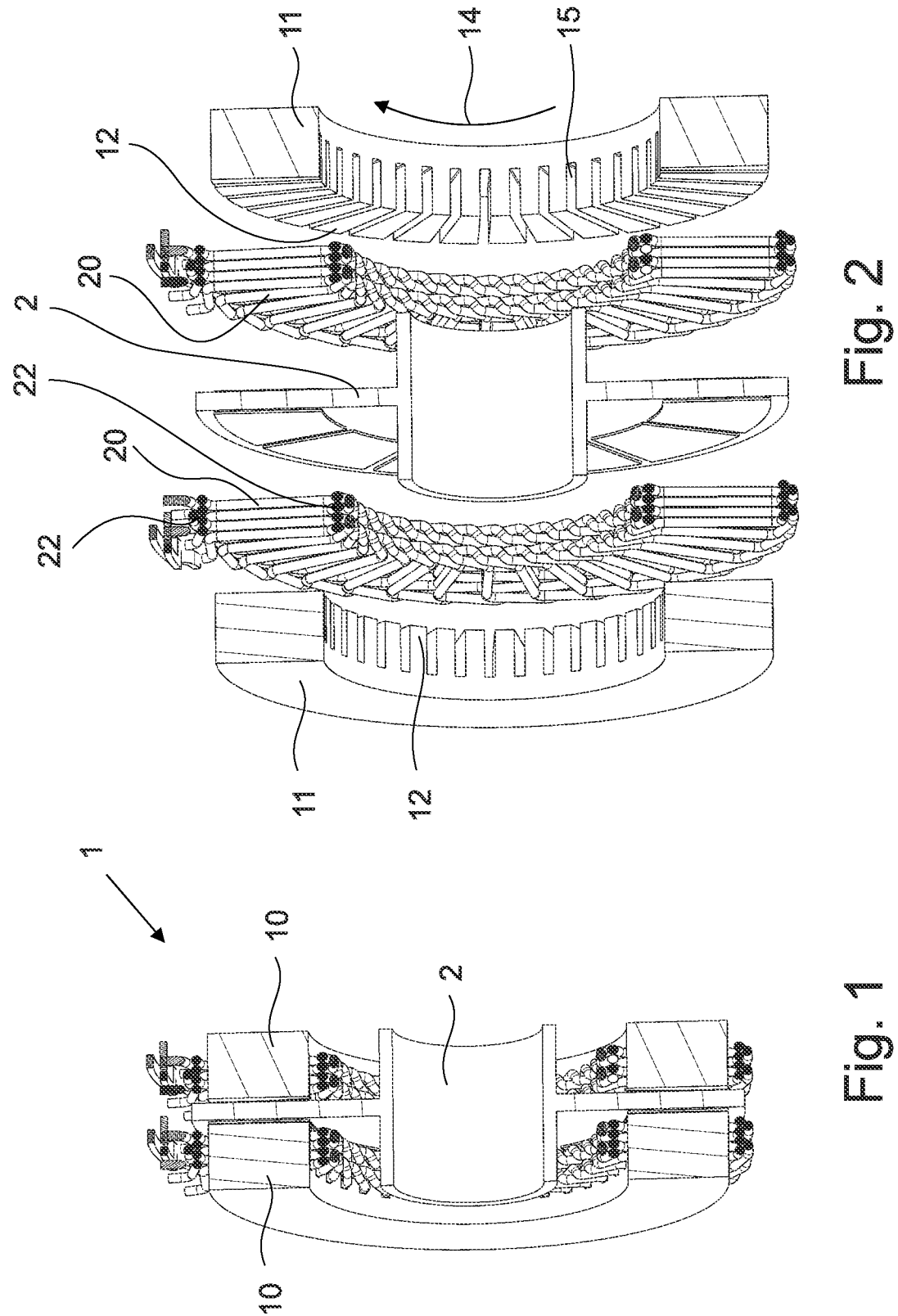
FIG. 1: shows an axial flux machine in an I arrangement in a perspective section.
FIG. 2: shows the axial flow machine in an I arrangement in an exploded view.

FIG. 1 shows an axial flux machine in an I arrangement with wave windings in a perspective section, which has a stator 10 on each side of a rotor 2. The respective stator 10 includes a stator body 11 which includes or forms a stator yoke. From the stator body 11 or also comprising it, the stator 10 has a plurality of stator teeth 12 arranged along a circumferential direction 14, which extend in the axial direction. The stator teeth 12 are separated from one another by grooves 15.

The stator 10 also includes one or more windings 20 of electrical conductors enlacing the grooves 15 and stator teeth 12. These windings are placed on the stator teeth 12 along a general winding direction 21 that runs along the circumferential direction 14.

The windings 20 form winding heads 22 on the radial inside of the stator teeth 12 and on their radial outside.

FIG. 2 shows the same design as in FIG. 1, however in an exploded view. The rotor 2 is arranged centrally between two stators 10, wherein each stator 10 has a winding 20 which is designed as a wave winding.

However, the present disclosure is not limited to the illustrated design of an axial flow machine, but can also be designed as an H-type, or one-sided axial flow machine having only one stator and only one rotor.

Figures 3, 4:
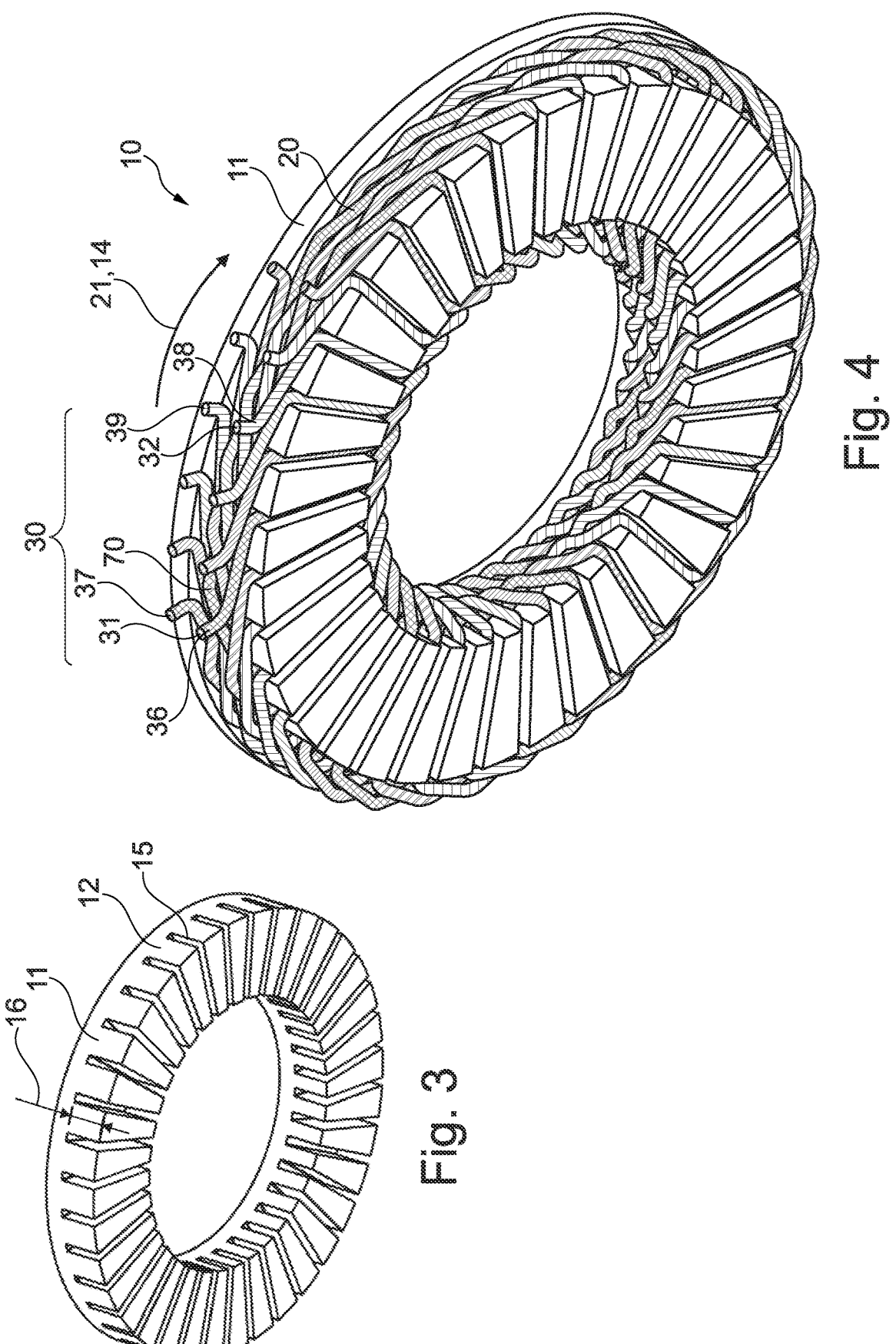
FIG. 3: shows a stator core in a perspective view.
FIG. 4: shows the stator core with windings.

FIG. 3 shows a perspective view of a stator core 11. The grooves 15 and their depth 16 are clearly visible here.

As FIG. 4 makes clear, the configuration of the stator according to the disclosure provides that linear conductor sections 33 of at least one conductor pair 30 are arranged in grooves 15, which form at least a proportion of windings 20 of the stator, wherein linear conductor sections 33 of the conductor pairs 30 in a respective groove 15 are arranged to be offset parallel to one another along the depth 16 of the groove 15, and the sequence in which the parallel conductor sections 33 are arranged in each groove 15, through which the conductors run, alternates along the circumferential direction 14.

A pair of conductors is illustrated in FIG. 4 by the first conductor 31 and the second conductor 32.

Deviating from the embodiment shown here, the linear conductor sections 33 can also be designed to be curved or saber-shaped. For conceptual clarification, however, conductor sections shaped in this way are also subsumed below under the term "linear conductor sections".

Figure 5:
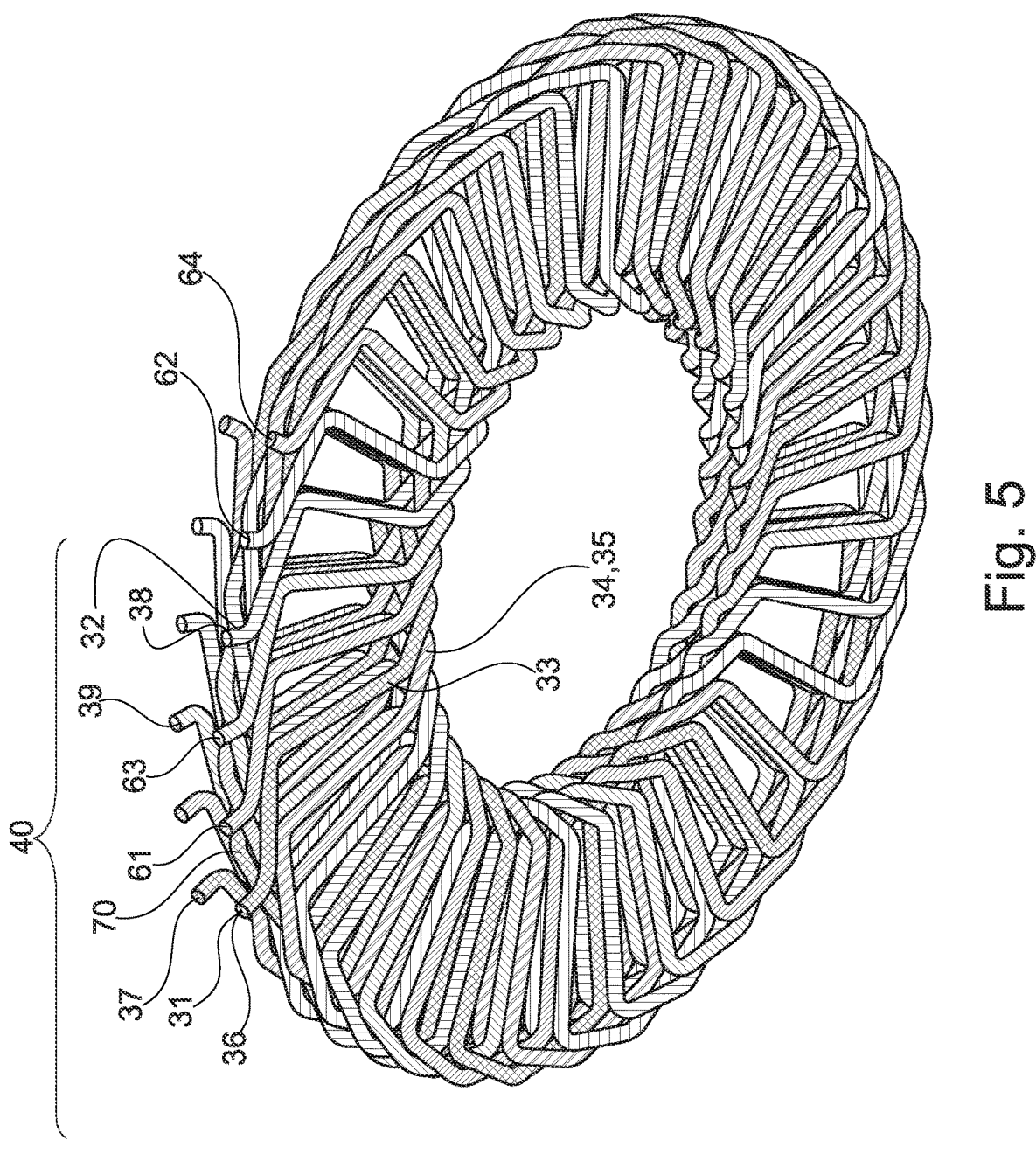
FIG. 5: shows a winding in a perspective view.

FIG. 4 shows that the conductors of the conductor pair 30 of the illustrated wave winding meander in a direction perpendicular to the circumferential direction 14 or in the radial direction, deviating from the winding direction 21 that basically runs in the circumferential direction 14. This has the result that the conductors of the conductor pair 30 with enlacings 34, as illustrated in FIG. 5, respectively enlace a group of stator teeth 12.

Current flows through the conductors of the conductor pair 30 in different circumferential directions. This is explained using the first pair of conductors 30.

A first conductor 31 of the conductor pair 30 is referred to as the positive conductor for this purpose. A second conductor 32 of the conductor pair 30 is referred to as the negative conductor for this purpose.

The first conductor 31 forms a first connection 36 of the positive conductor and a second connection 37 of the positive conductor.

The second conductor 32 forms a first connection 38 of the negative conductor and a second connection 39 of the negative conductor.

Said conductors are organized to be correspondingly connected to three phases, with one positive winding and one negative winding per phase.

A respective conductor 31, 32 of the conductor pair 30 enlaces a group 13 of stator teeth 12 on different radial sides, so that the current flow in a respective common groove 15 takes place in both conductors 31, 32 along the same direction.

It can be seen here that the stator 10 includes not only one pair of conductors, but three pairs of conductors, wherein a third conductor 61 and a fourth conductor 62 form the second pair of conductors, and a fifth conductor 63 and a sixth conductor 64 form the third pair of conductors.

However, only sections of conductors of a conductor pair are arranged in a respective groove 15.

In addition, it can be seen from FIG. 4 that the conductors of a conductor pair alternate with regard to the axial sequence in which they are arranged in a groove 15.

For better clarification of the course of the conductors, FIG. 5 shows the winding assembly produced without the stator teeth.

All conductors are once again clearly visible here in a perspective view.

Furthermore, it can be seen that a respective pair of conductors 30 enlaces a group 13 of stator teeth 12 which respectively includes three stator teeth 12.

Due to the alternating arrangement of the conductors of a respective conductor pair 30 in the grooves 15, it is necessary for these conductors to cross. For this purpose, the conductors form connecting conductor sections 35 which connect the linear conductor sections 35 to one another and ensure that the respective conductor runs back and forth between two arrangement planes between the grooves 15 in which the relevant conductor runs.

For the three phases shown, one phase occupies every third groove 15.

The axially first conductor layer in a relevant groove 15 is alternately assigned a positive or a negative phase. A layer can also consist of several discrete individual wires.

FIGS. 4 and 5 show the winding 20 with the formation of two what are termed double layers 60. A double layer 60 designates the course of a conductor in two mutually parallel planes. Correspondingly, two double layers 60 comprise four planes.

To enable the conductors of the conductor pair 30 to run in the four planes, the conductors each form a transition section 70, as is shown by way of example using the first conductor 31. This transition section 70 allows the first conductor 31 to pass from a second plane to a third plane.

Such a transition section 70 is also referred to as a layer jump.

FIG. 6 once again shows the realized winding 20 in a side view. A common connection region 40 of the conductors realized on the circumference is also clearly visible.

FIG. 7 clearly shows the arrangement of the conductors 31, 61, 63, 32, 62, 64 in different planes, namely in a first plane 51, a second plane 52, a third plane 53, and a fourth plane 54.

Furthermore, the connecting conductor sections 35 can be seen here, which ensure that the conductors 31, 61, 63, 32, 62, 64 can switch between the first plane 51 and the second plane 52, and between the third plane 53 and the fourth plane 54.

FIG. 8 shows the same winding 20 in the same side view as FIG. 7, only without clarifying the course of the planes.

FIG. 9 shows a top view of the winding 20 shown in FIG. 6 where the transition sections 70 are recognizable, which bring the first conductor 31 and the second conductor 32 from the second plane 52 to the third plane 53.

FIG. 10 shows a sectional illustration according to the course of the section indicated in FIG. 6. Also seen in section here are the connecting conductor sections 35, which are used for crossing the conductors and at the same time form part of the winding heads 22.

It can additionally be seen here that the winding heads 22 can be designed in such a way that they are not, or are only slightly, wider than the width of a relevant groove 15, and accordingly have a small axial space requirement.

In addition, the winding heads 22 are also designed to be radially flat, so that a larger radius can be realized in the torque-active region of axial flux machines equipped therewith.

This principle for designing a wave winding can also be used for radial flux machines.

A winding 20 with two double layers 60 is thus shown, which occupy a total of four layers or planes 51, 52, 53, 54 in the axial direction. An even number of layers or planes is required for this. Since two layers or planes each represent a common structure, two layers that belong together are referred to as a double layer 60.

The planes 51, 52, 53, 54 shown here do not necessarily need to be planar or even. For example, to follow a conical rotor, these planes 51, 52, 53, 54 could also be conical.

Figure 11:
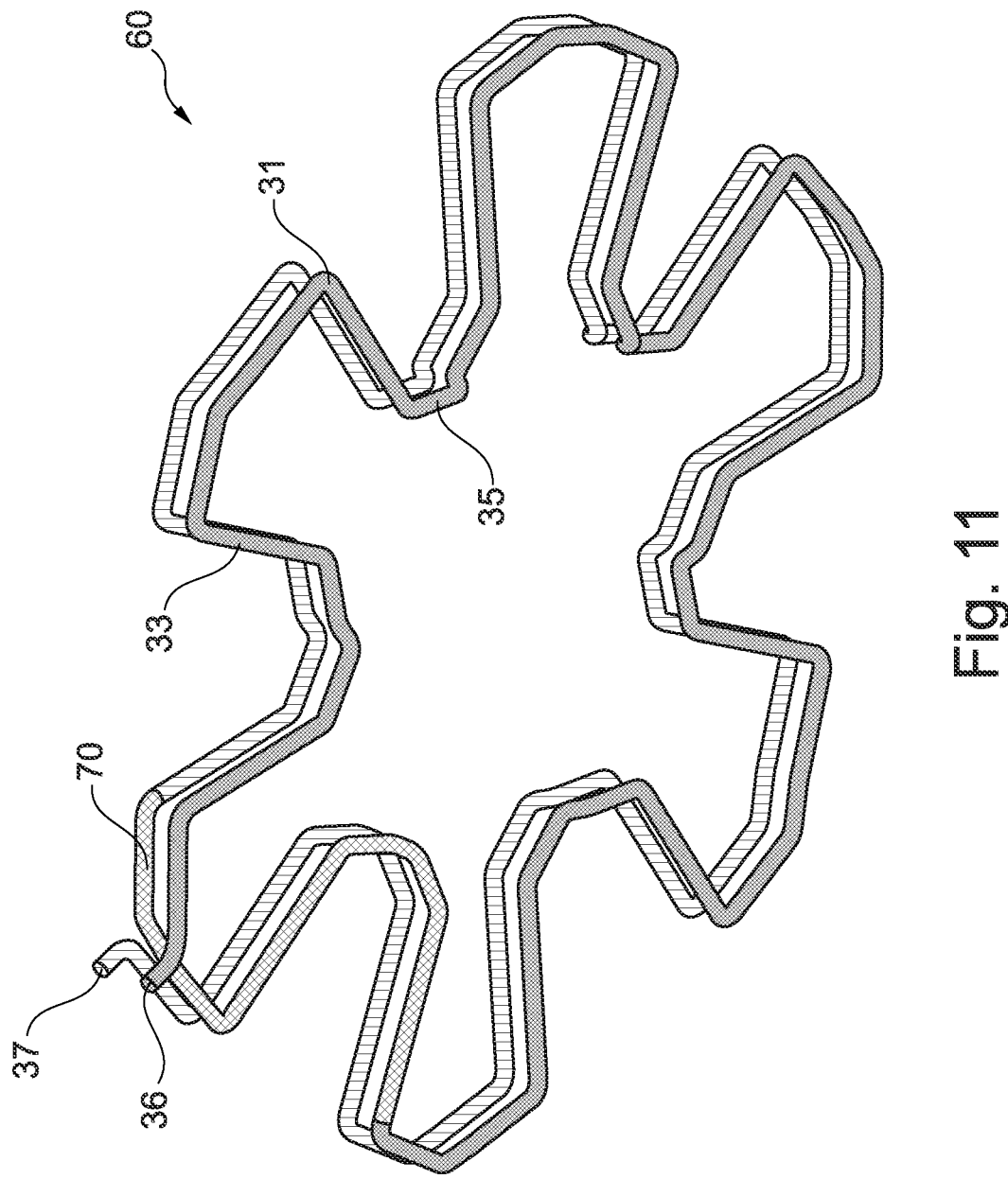
FIG. 11: shows a conductor element in a double layer.

To clarify a respective conductor course, FIG. 11 shows the first conductor 31 for one phase in a winding with two double layers in an individual, perspective representation. It can be seen that the linear sections 33 are each followed by connecting conductor sections 35 which guide the first conductor 31 back and forth between individual arrangement planes. After completing one rotation, starting from a first connection 36, the first conductor 31 forms a transition section 70 which brings the first conductor 31 axially behind the winding already implemented. There the first conductor again runs through one rotation until it ends at the second connection 37 thereof. The first connection 36 and the second connection 37 are essentially in the same angular range.

Figure 12:
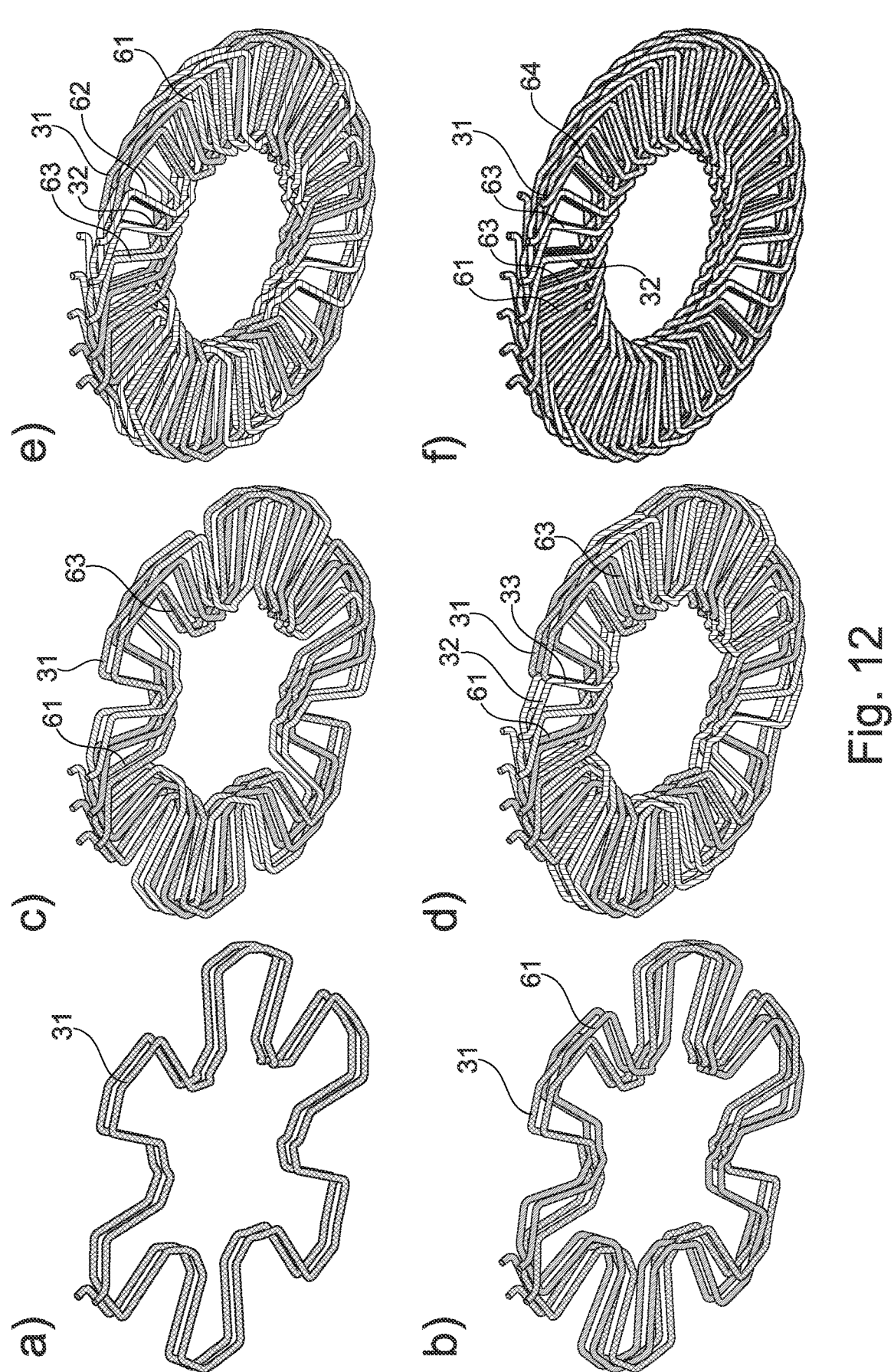
FIG. 12: shows in the partial illustrations a) to f), the arrangement of individual conductor elements in the winding.

FIG. 12 shows the implementation of the overall winding in 6 partial illustrations a) to f).

Partial illustration a) shows the first conductor 31, as has already been explained with reference to FIG. 11. Partial illustration b) shows the first conductor 31 and a third conductor 61. Partial illustration c) shows the first conductor 31, the third conductor 61, and a fifth conductor 63. For example, these conductors all form what is termed a positive conductor of the respective phase. In addition to the conductors shown in partial representation c), partial representation d) now also shows the arrangement of the second conductor 32, which belongs to the same phase as the first conductor 31. As already described, it can also be seen here that linear conductor sections 33 of the first conductor 31 and of the second conductor 32 are arranged in such a way that they can be placed together in grooves.

Partial representation e) shows all the conductors already shown in partial representation d) and also a fourth conductor 62 which, together with the third conductor 61, forms a second pair of conductors. Partial representation f) shows all the conductors already shown in partial representation e) and additionally a sixth conductor 64 which, together with the fifth conductor 63, forms a third pair of conductors. In addition, partial representation f) shows that the winding heads 22 are approximately as wide as the axial length required for the conductors in the grooves.

A winding 20 with two double layers 60 is shown in each of FIGS. 7 through 10, but the winding 20 can also consist of only one double layer or also have more than two double layers. The second conductor 32, the fourth conductor 62 and the sixth conductor 64 each form what is termed the negative conductor.

It can also be seen in FIGS. 6 through 10 that the linear conductor sections 33, which run in the grooves 15, are each connected to connecting conductor sections 35, which—when the stator is designed in an I arrangement—increase the radial distance to the stator core and at the same time bridge part of the distance to the next groove 15 belonging to the same phase in the circumferential direction, and this on the radially inner as well as on the radially outer winding head 22. Since the linear conductor sections 33 of a double layer to be connected are located on different layers or planes, the connecting conductor section 35 also carries out the necessary change of position at the same time.

Figure 13:
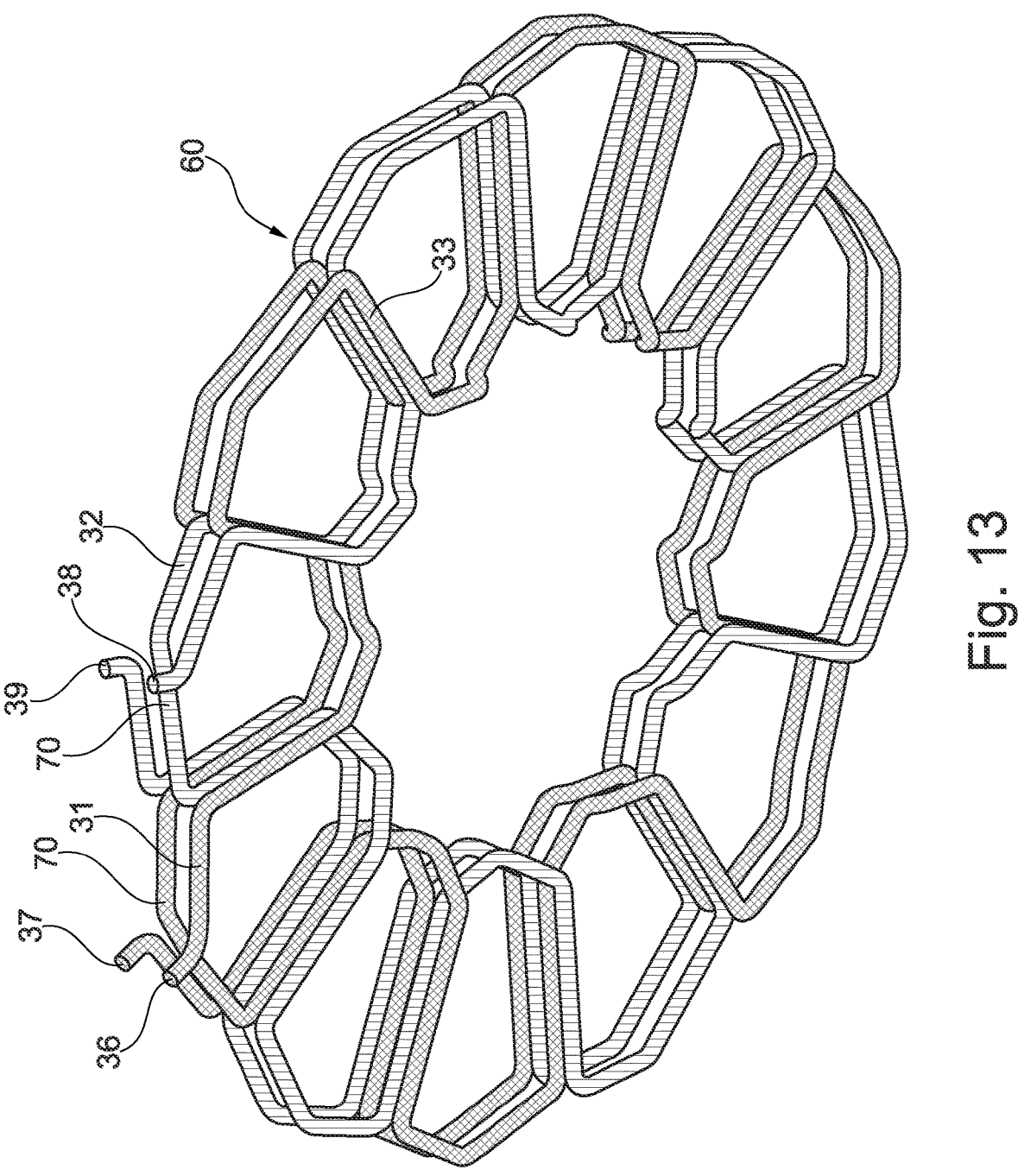
FIG. 13: shows the arrangement of the positive conductor and negative conductor.

To illustrate a pair of conductors 30, the course of the first conductor 31 and of the second conductor 32 is shown once again in FIG. 13. Here it can be seen that the linear conductor sections 33 overlap each other along the axial direction, so that they can be represented together in grooves. Furthermore, it can be seen that each of the two conductors 31, 32 shown here forms a transition section 70 or layer jump.

Figure 14:
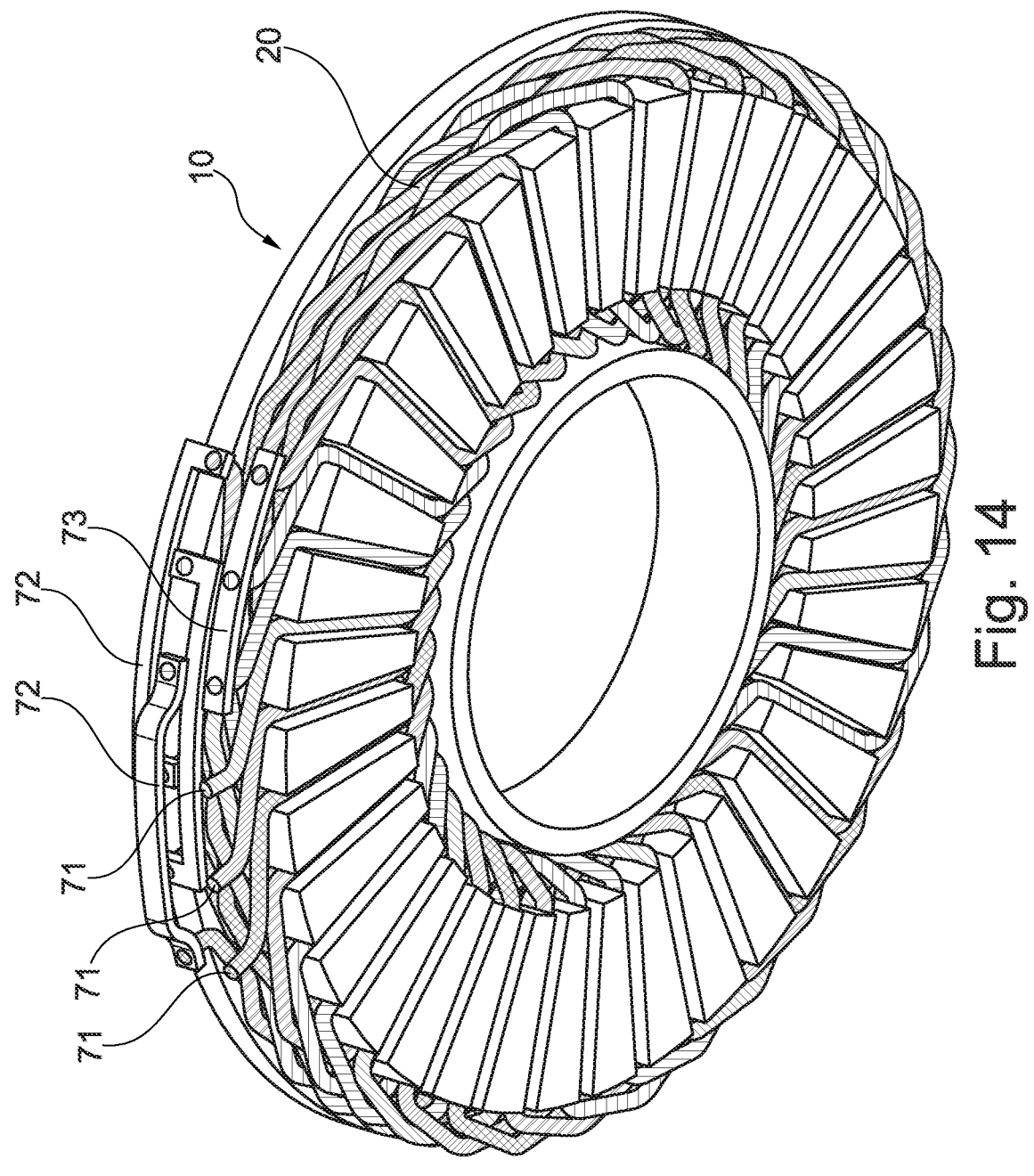
FIG. 14: shows the stator core with windings and electrical connections.

FIG. 14 shows the stator 10 with the winding 20 and a corresponding electrical interconnection.

In this case, FIG. 14 shows an advantageous connection of the positive and negative windings, resulting in a star connection of the windings with three connections for a connection to the power electronics. The phase supply or the connection to the power electronics takes place via the first connections of the positive windings, also called positive connections 71. The individual second connections of the positive windings are each connected individually to the second connections of the associated phase of the negative windings. The first connections 73 of the negative windings are interconnected to form a star connection. This connection ensures that the positive and negative windings of a phase are connected in such a way that the conductor pieces in the grooves have the same current direction. Compared to a hairpin winding, where a connection must be made for the conductor in a groove, the wiring effort is reduced to four connection points per phase.

Alternatively, the connection shown can also be used for a series connection 72. Deviating from the exemplary embodiments presented here, the stator designed according to the disclosure can also be designed for more or fewer than 3 phases.

FIGS. 15-26 relate to an embodiment of an alternative method of producing a winding of the stator.

The process described here relates to the production of windings in two double layers.

For this purpose, as shown in FIGS. 15-18, a first fin 80, a second fin 90 and a third fin 100 are aligned in such a way that their longitudinal axes run essentially parallel to one another. The first fin 80 is organized to produce turns of a first double layer. The third fin 100 is organized to produce turns of a second double layer.

The fins each have a geometry that favors the later process steps of bending into a flattened mat and bending into a circular shape.

Figure 16:
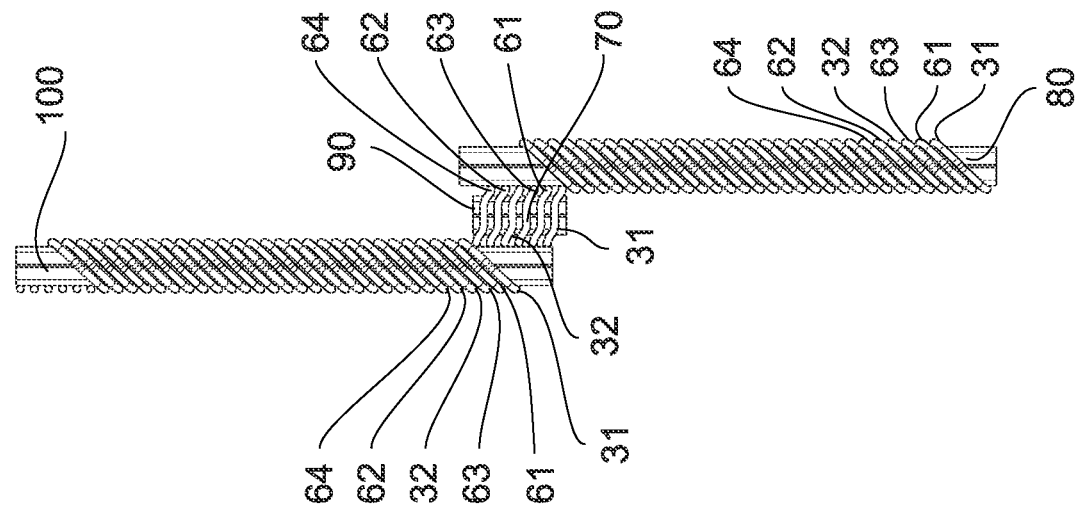
FIG. 16: shows fins with several windings arranged thereon in plan view.
Figure 15:
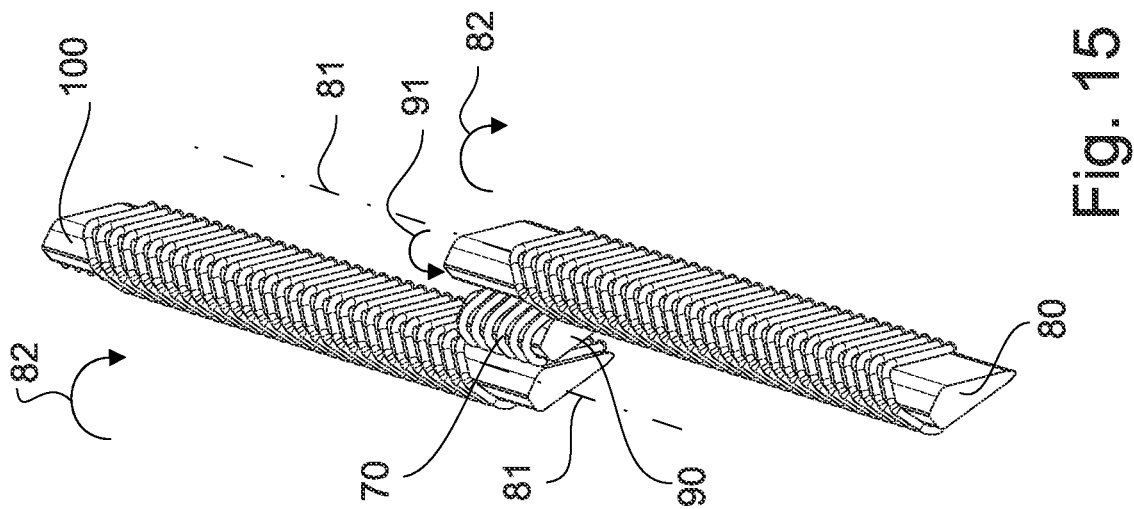
FIG. 15: shows fins with several windings arranged thereon in a perspective view.

As FIGS. 15 and 16 illustrate in different views, the first conductor 31, the second conductor 32, the third conductor 61, the fourth conductor 62, the fifth conductor 63, and the sixth conductor 64 are wound around the first fin 80 along a first winding direction 82, here in the mathematically positive sense. It makes sense to rotate and move the first fin 80 about the longitudinal axis 81 thereof so that the following windings reach the first fin 80 adjacent to windings that are already present.

With regard to the conductor pair, which includes the first conductor 31 and the second conductor 32 and forms the first phase, it should be mentioned that the third conductor 61 and the fifth conductor 63 are located between the first conductor 31 and the second conductor 32, while they belong to the second phase and the third phase.

During the winding onto the first fin 80, the second fin 90 has not yet been brought into position, so that it does not interfere with the winding process on the first fin 80. The second fin 90 is not positioned until the required turns on the first fin 80 have been created. After completing the necessary number of turns, the second fin 90 is positioned to be adjacent to the first fin 80 and the winding direction is reversed for approximately half a rotation. In this way, the conductors are guided over the second fin 90 in a second winding direction 91 which runs in the opposite direction to the first winding direction 82.

By reversing the winding direction, the conductors are pre-bent for the layer jump. After that, said conductors are again wound up along the first winding direction 82 on the third fin 100, which is positioned after said half reverse rotation. If more double layers are required, the number of fins and the number of windings carried out is increased accordingly. If there are more than two layer jumps or transitions between double layers, additional second fins can be used. After the windings have been produced, the wound conductors can be pressed together to form a winding mat, so that this winding mat has approximately the same axial extent as the depth of the grooves in the stator body in which the winding or windings are to be accommodated. This winding mat can still be bent into an annular shape to facilitate insertion into the grooves of the stator core.

The implementation of the method is not necessarily restricted to the sequence of the steps mentioned above.

The use of the second fin 90 and the third fin 100 can be dispensed with to implement a winding mat with only one double layer.

The present method can also be used to produce windings for radial flux machines.

Figure 18:
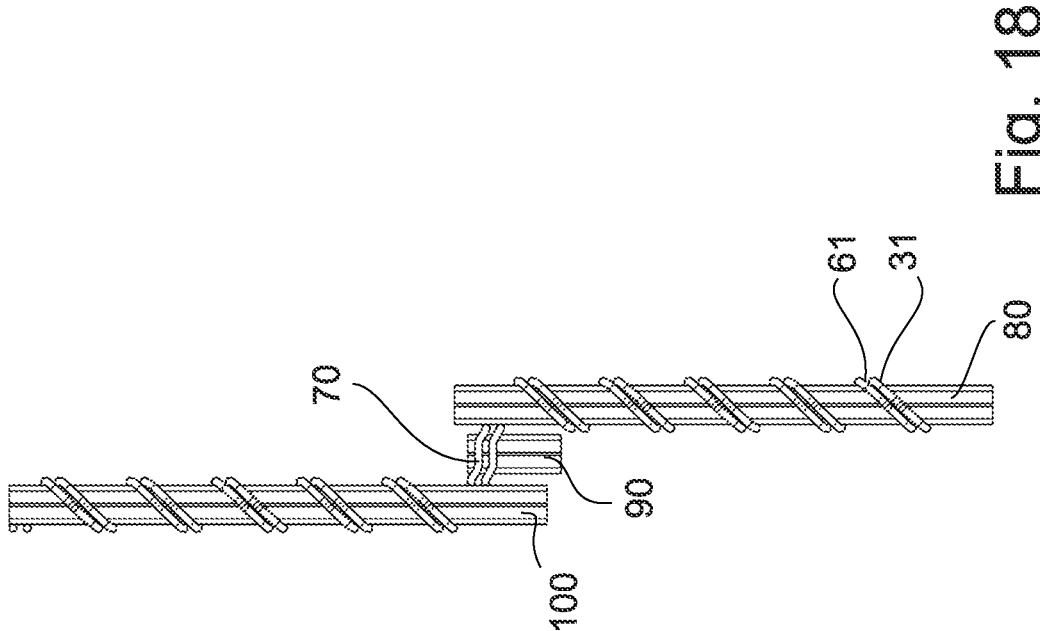
FIG. 18: Shows fins with only one winding arranged thereon in plan view.
Figure 17:
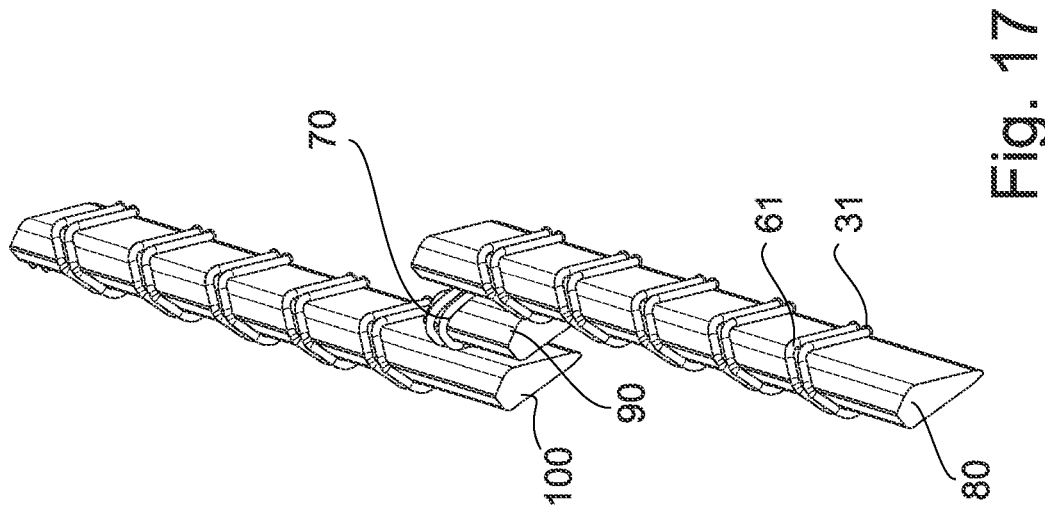
FIG. 17: shows fins with only one winding arranged thereon in a perspective view.

For a simplified explanation of the process sequence, the winding processes are illustrated by way of example in FIGS. 17 and 18 with only two conductors of 2*n conductors, namely the first conductor 31 and the third conductor 61.

It is also clearly visible here that the two transition sections 70 are formed by enlacing the second fin 90 with these conductors 31, 61.

Figure 20:
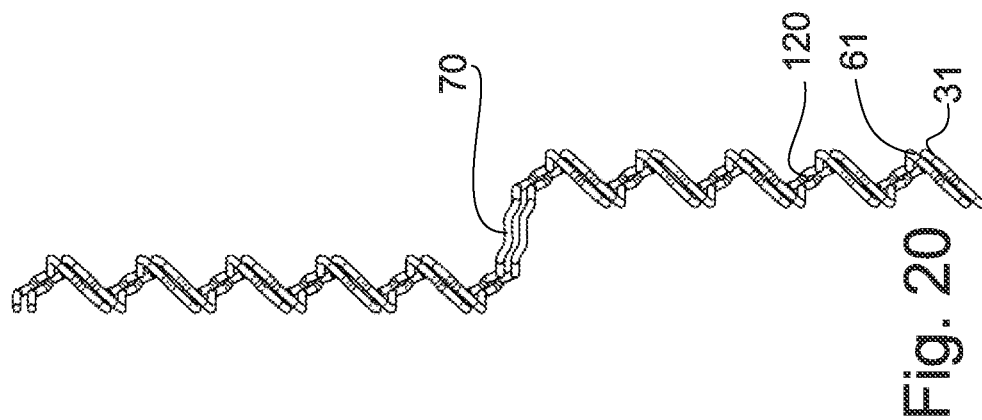
FIG. 20: shows the winding produced in plan view.
Figure 19:
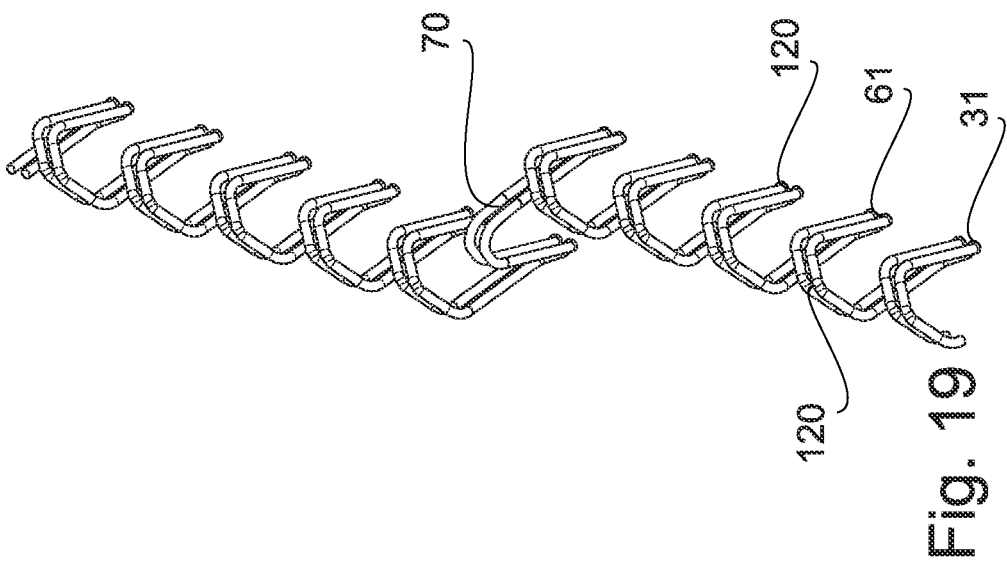
FIG. 19: shows the winding produced in a perspective view.

FIGS. 19 and 20 show the windings 20 produced after the fins have been withdrawn. It can be seen that the winding structure has been preserved and the bridging sections 70 are also formed.

Figure 21:
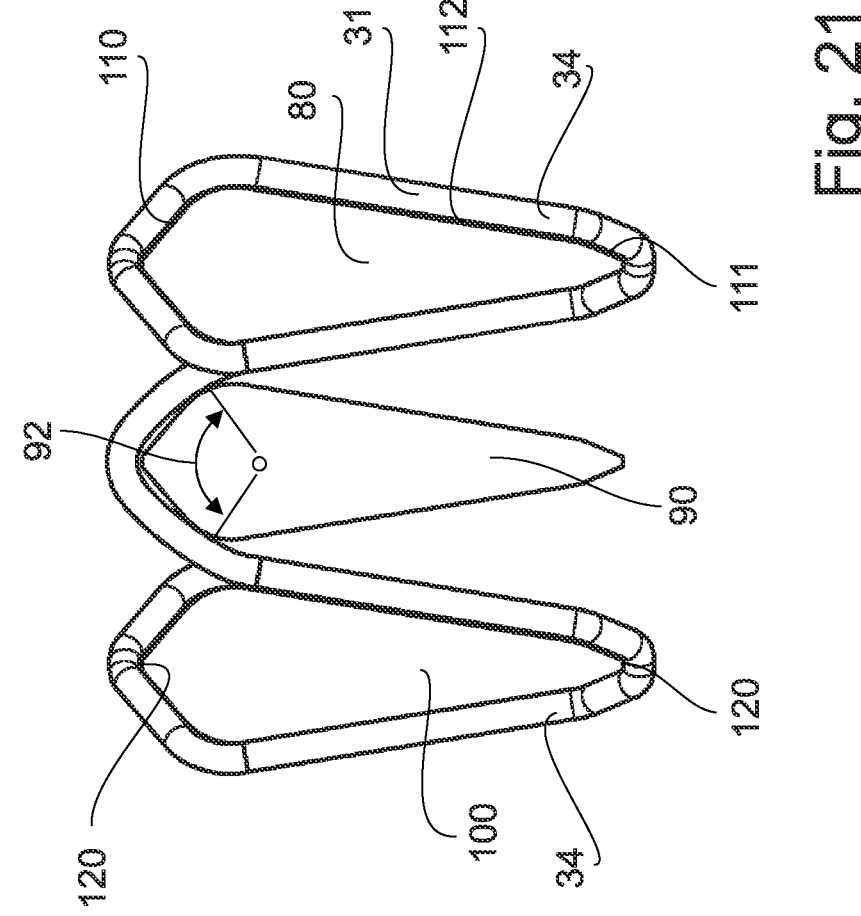
FIG. 21: shows the fins with windings in a front view.
Figures 22, 23:
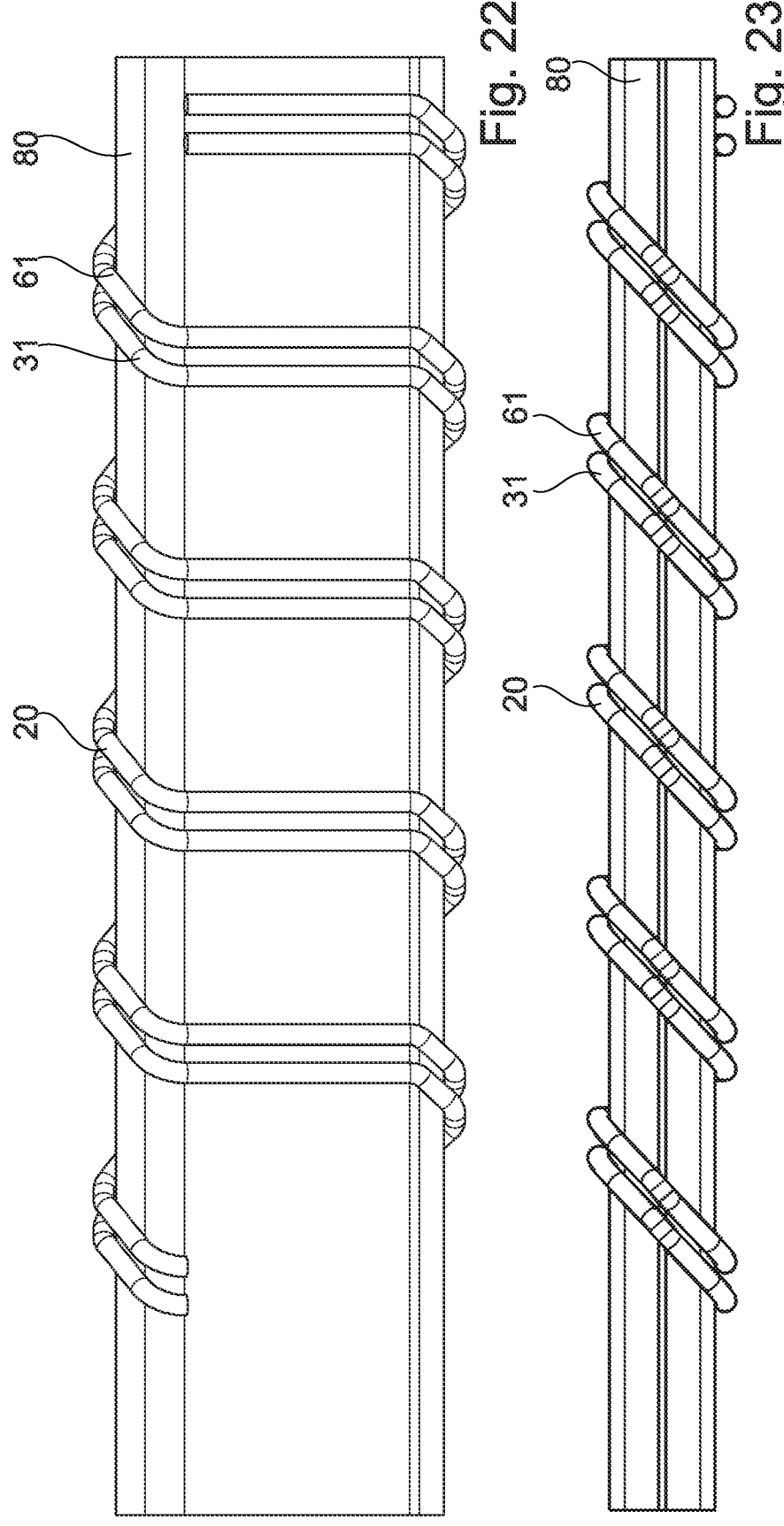
FIG. 22: shows a fin with winding in a view from the side.
FIG. 23: shows a fin with a winding in plan view.

FIG. 21 shows the 3 fins 80, 90, 100 in a front view when the first conductor 31 is being wrapped. It can be seen that the first conductor 31 completely enlaces the first fin 80 and also the third fin 100. However, the second fin 90, which is located between the first fin 80 and the third fin 100, is only enlaced at the upper side thereof in a limited enlacing angle 92. Correspondingly, the enlacings around the first fin 80 and the third fin 100 form enlacings both on a first enlacing side 110 and on a second enlacing side 111 opposite this first enlacing side 110. The first conductor 31 is guided essentially linearly on flat side surfaces 112 of the fins 80, 100.

It can be seen that, when the generated winding is equated with a harmonic oscillation, the first enlacing side 110 forms an extreme value range 120 and the second enlacing side 111 forms an opposite extreme value range 120.

In the extreme value regions 120 lying opposite one another, the winding is designed with a different width to adapt the shape thereof to the fact that the distance between the grooves in the stator body is greater on the radial outside than on the radial inside.

FIGS. 22 and 23 again show the winding 20 around the first fin 80 in different views.

Figures 24, 25:
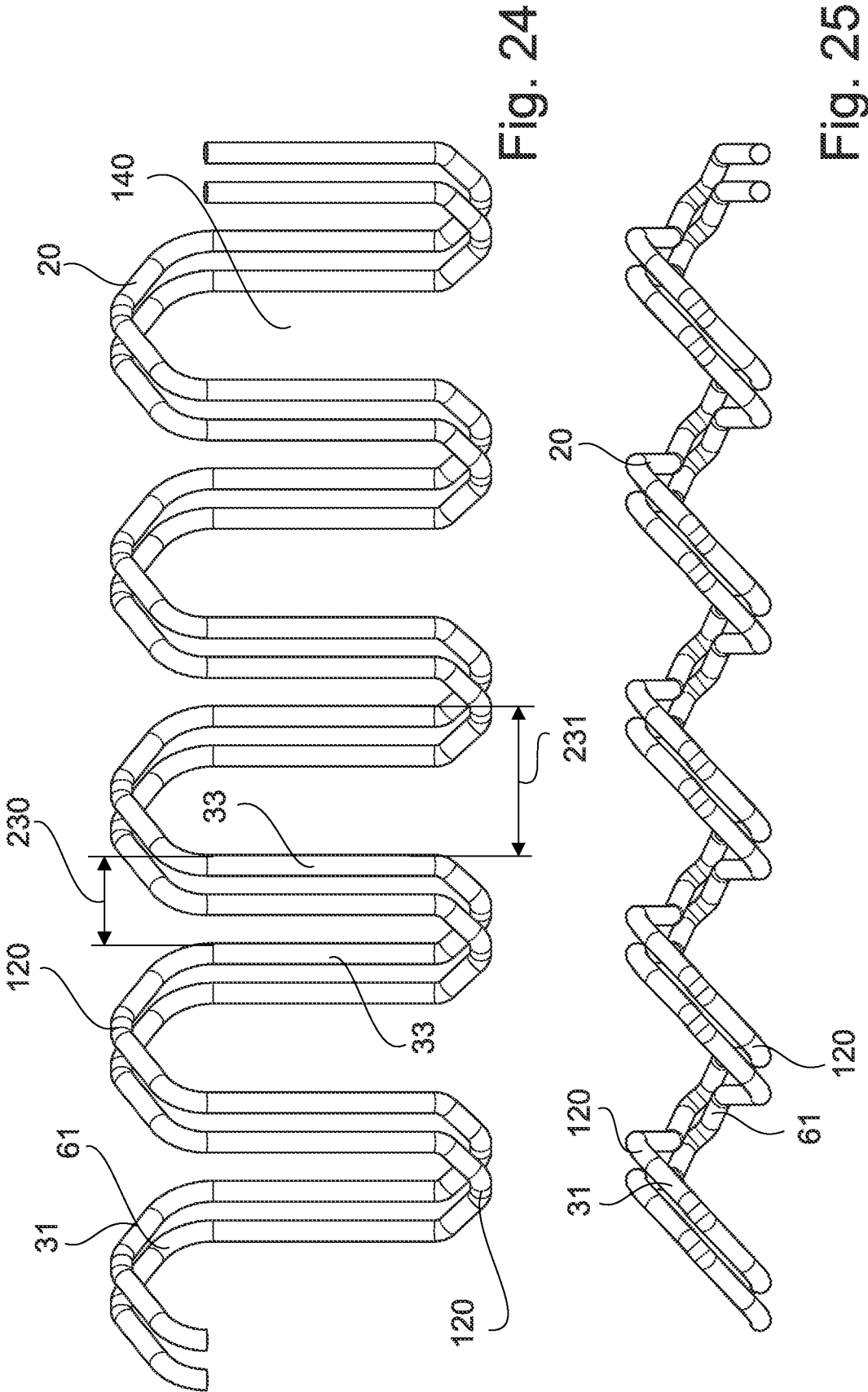
FIG. 24: shows the winding produced in a view from the side.
FIG. 25: shows the winding produced in plan view.

FIG. 24 shows the winding 20 produced in a side view and FIG. 25 shows the winding 20 produced in a plan view. In particular, the extreme value ranges 120 formed by the winding 20 can be seen very clearly in FIG. 24. It can also be seen that each of the two conductors 31, 61 forms meshes 140.

It can also be seen here that the distance between the linear conductor sections 33 within a shaft section is spaced apart from one another in an alternating manner by a first distance 230 and a second distance 231, wherein the second distance 231 is greater than the first distance 230. This takes account of the fact that the outer winding heads must bridge greater distances in the circumferential direction than the inner winding heads. If this method is used for the stator windings of a radial flux machine, the distances for the two winding heads are similar. These may change with the radius on which the winding layer lies, in that the fins used one after the other are designed with different widths for the individual double layers.

Figure 26:
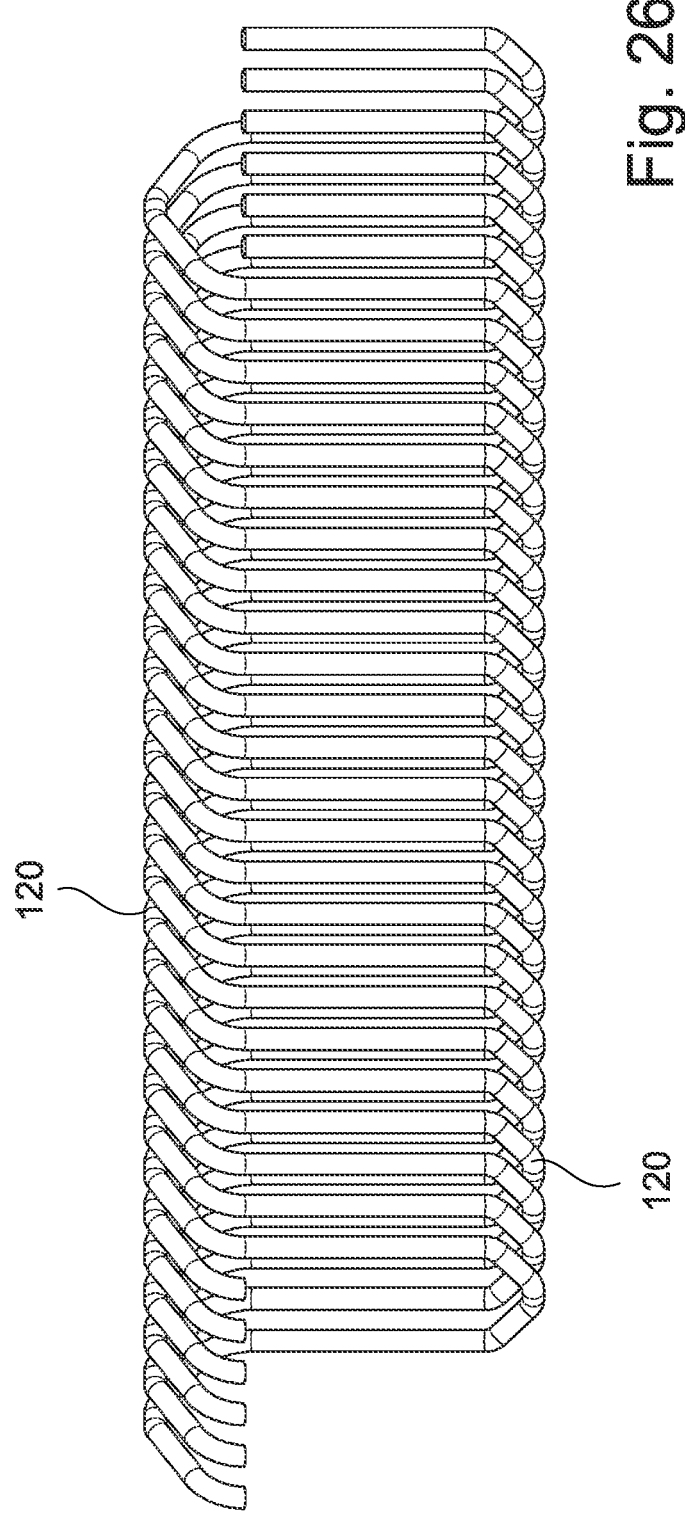
FIG. 26: shows the winding produced.

FIG. 26 shows a winding which includes all six conductors forming the three phases.

FIGS. 27-38 relate to an embodiment of the method for producing a winding of the stator according to the disclosure.

Figures 27, 28:
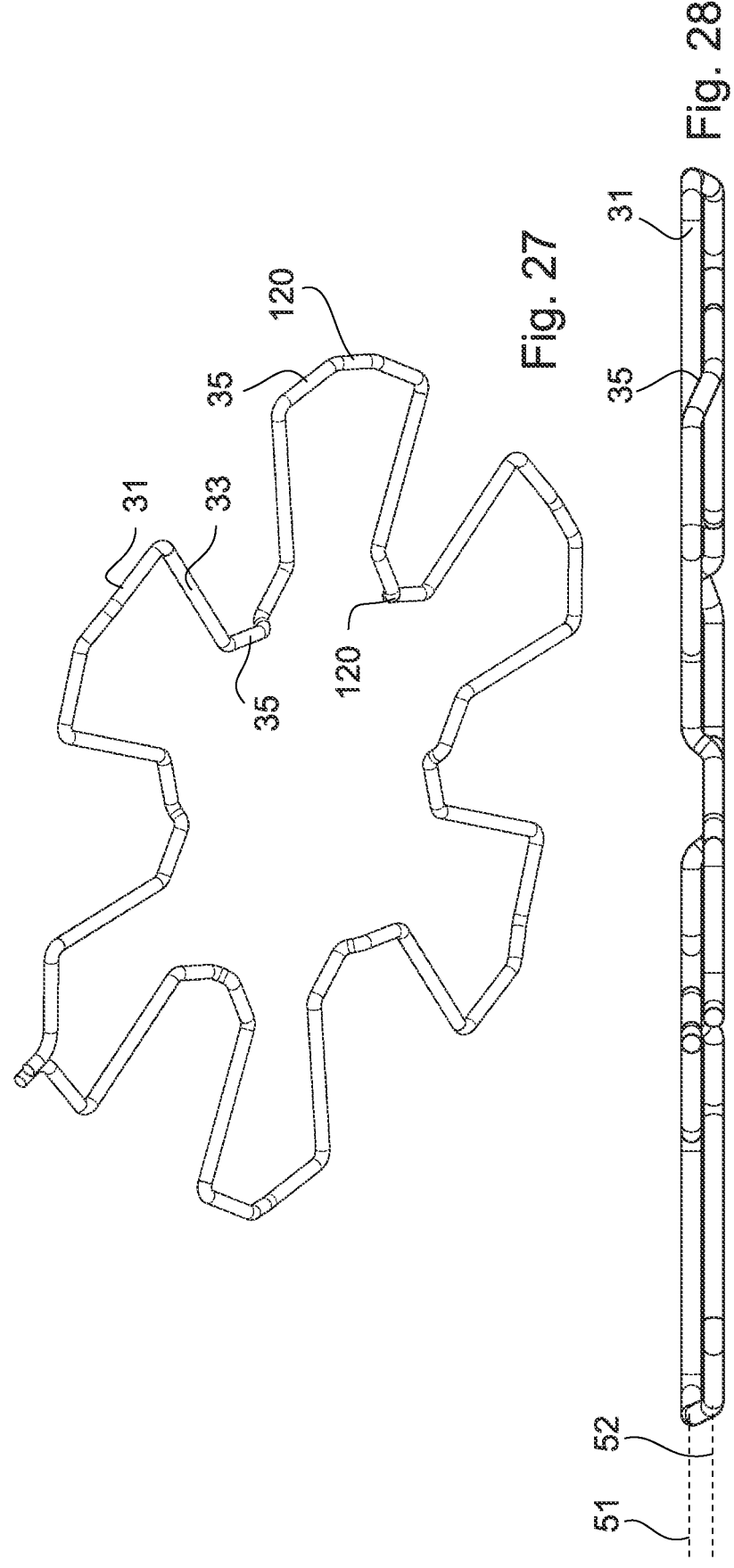
FIG. 27: shows a conductor element in a perspective view.
FIG. 28: shows the conductor element in a view from the side.

FIG. 27 shows the first conductor 31 in a double layer as an example. The individual sections of the first conductor 31 can be seen once again, namely the linear conductor sections 33 as well as the connecting conductor sections 35 and, in the sections that are radially furthest inside and outside, the extreme value ranges 120.

In a side view, FIG. 28 clearly shows that the connecting conductor sections 35 ensure that the first conductor 31 runs alternately between a first plane 51 and a second plane 52.

Figure 29:
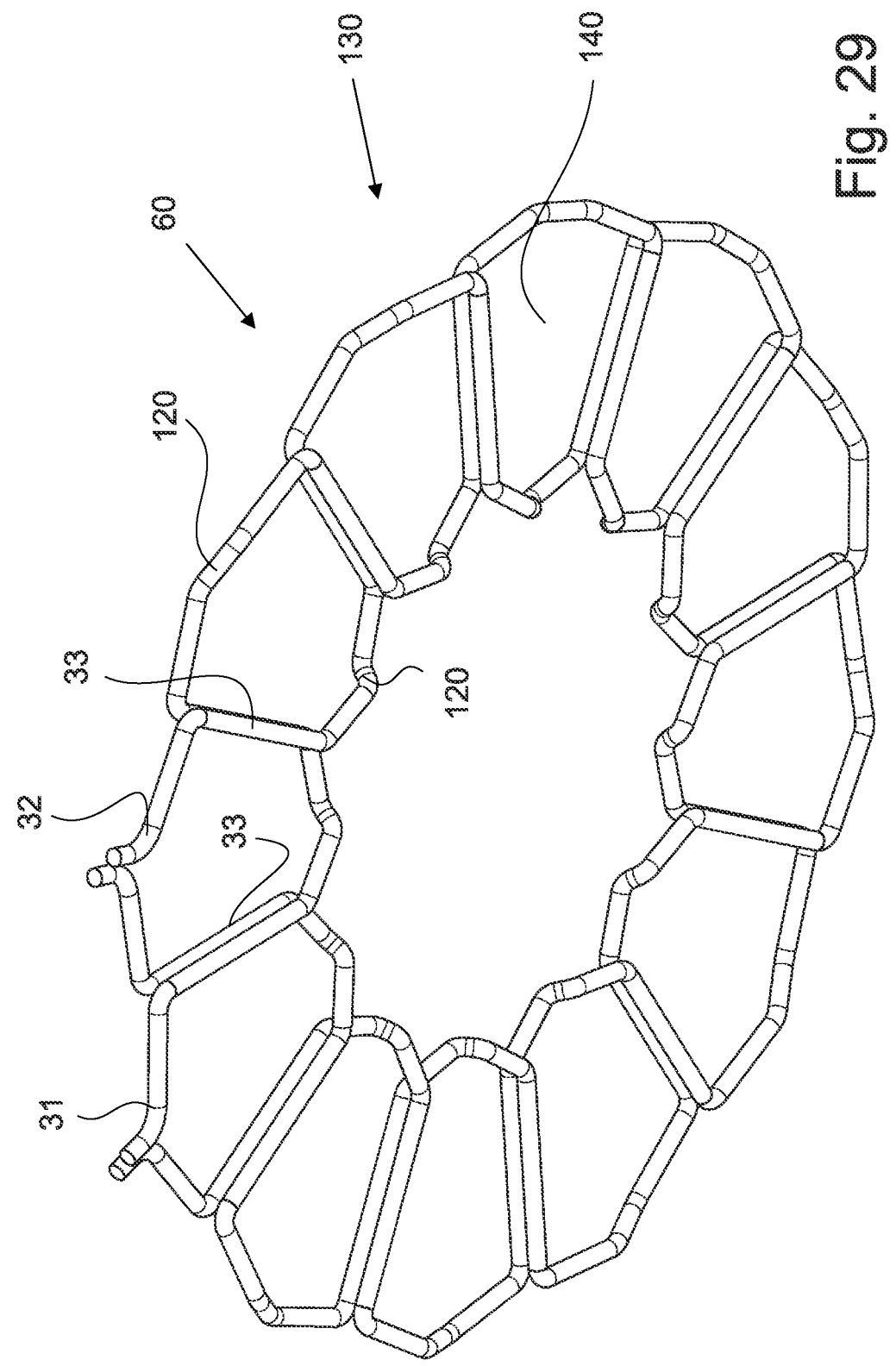
FIG. 29: shows a conductor element in a perspective view.

FIG. 29 shows a braid 130, which is formed by the first conductor 31 and the second conductor 32, so that together they result in a positive phase and a negative phase. These two conductors 31, 32 form a plurality of meshes 140. It can be seen that the two conductors 31, 32 are guided alternately in the two arrangement planes. This means that the linear conductor sections 33 of the two conductors 31, 32 are alternately arranged axially at the front and axially at the rear.

Figures 30, 31:
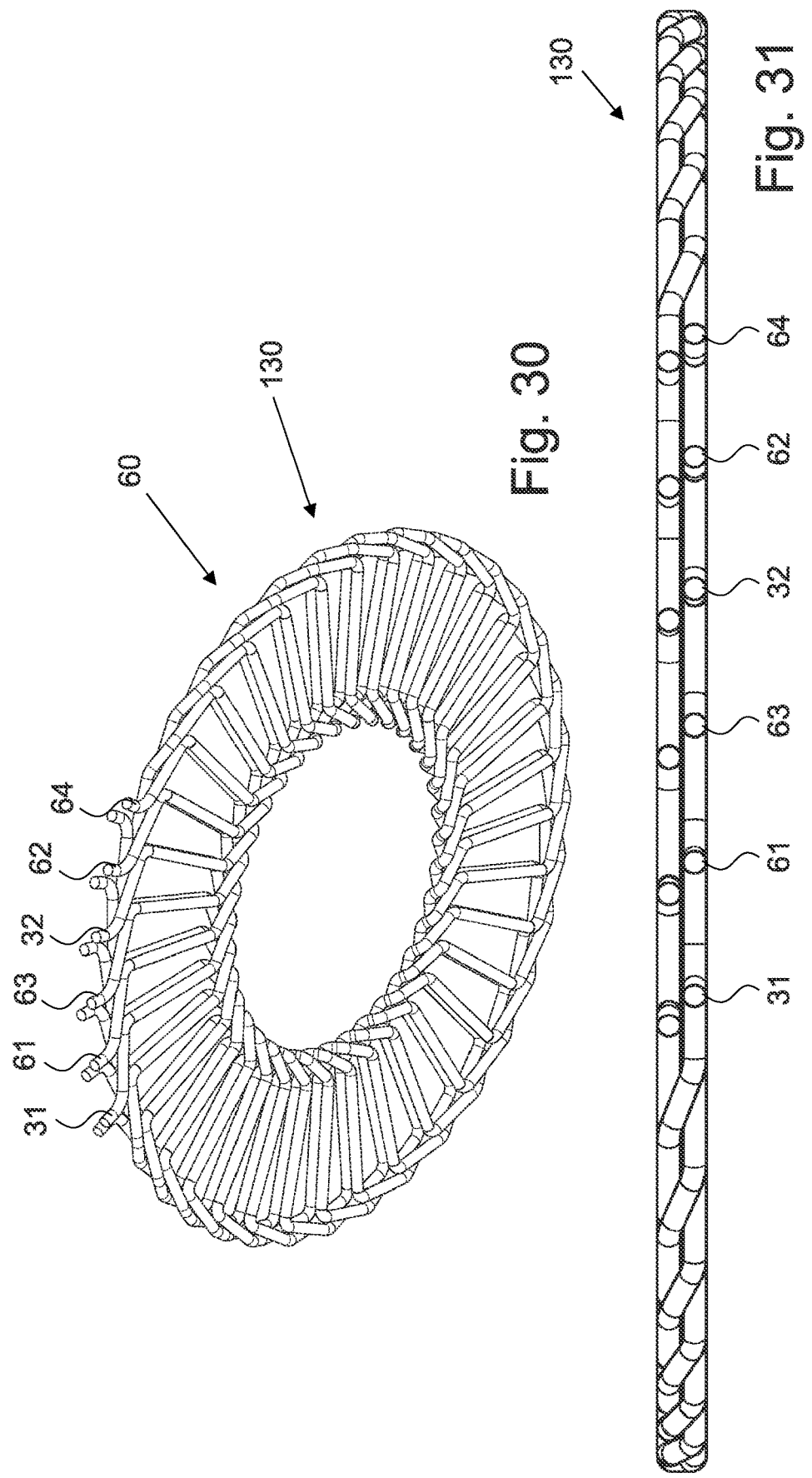
FIG. 30: shows a winding in a perspective view.
FIG. 31: shows the winding in a view from the side.

FIG. 30 now shows a braid 130 which has been supplemented by a third conductor 61, a fourth conductor 62, a fifth conductor 63, and a sixth conductor 64 in the manner described for FIG. 29. These six conductors, organized for the connection of three phases, together form a complete double layer.

FIG. 31 shows this braid 130 in a view from above.

The procedure for producing such a braid will now be explained with reference to FIGS. 32-35.

Figures 32, 33:
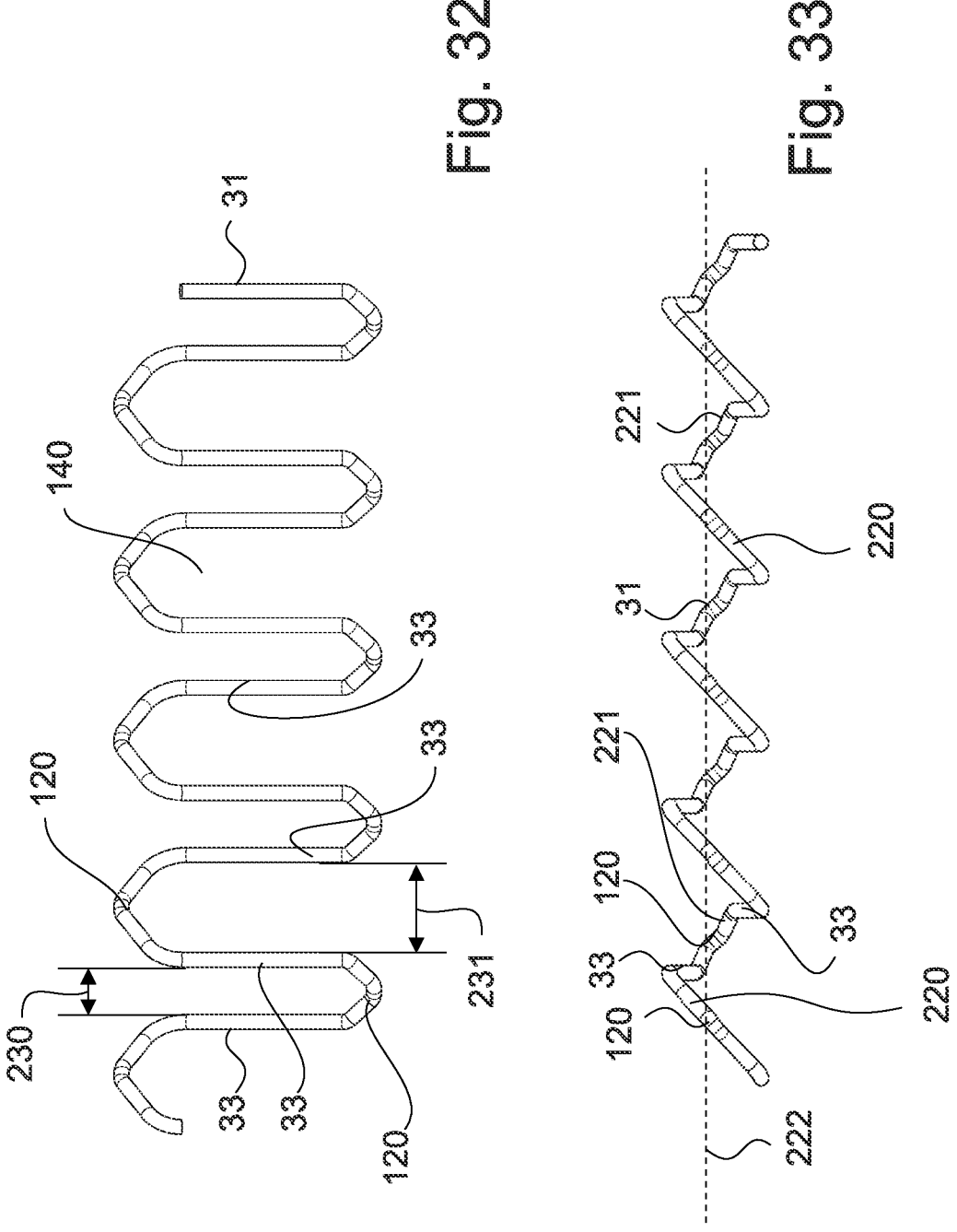
FIG. 32: shows a conductor element in a view from the side.
FIG. 33: shows a conductor element in plan view.

First, as shown in FIG. 32, a first conductor 31 is provided which is in a meander shape or zigzag shape. It can be seen here that a first spacing 230 and a second spacing 231 are realized alternately between adjacent linear conductor sections 33, wherein the second spacing 231 is greater than the first spacing 230. This leads to different widths of the meshes 140 formed as a result, which are open at the top and bottom.

FIG. 33 makes it clear that the first conductor 31 shown here not only meanders in one plane, but also in the plane running perpendicular thereto, so that the first conductor 31 forms a screw-thread shape or a three-dimensional spiral. In a practical implementation, this three-dimensional spiral can also be designed to be significantly flatter than that shown in FIG. 33. In the extreme case, the conductor in FIG. 33 is already as flat as it was after it was inserted into the grooves of the stator. A central plane 222 leads through the extreme value ranges 120. The course of the conductors in wave form or spiral form already has features that favor the subsequent steps for forming into a winding mat. The conductor pieces for the later inner winding head are shorter/smaller than the conductor pieces for the later outer winding head, so that the distances 230, 231 between the conductor pieces for the winding grooves are also of alternating different sizes. The non-circular shape of the three-dimensional helical form is formed in such a way that in the later process steps, the braid is then flattened to produce the desired contour for forming the inner and outer winding heads, as well as the linear conductor sections for the winding grooves.

This means that the zigzag shape is three-dimensional, wherein by equating the zigzag shape with a harmonic oscillation, linear conductor sections 33 of the relevant conductor which have a positive slope 220, and linear conductor sections of the relevant conductor which have a negative slope 221, are arranged in the middle on both sides outside of a central plane 222 running through regions of the extreme values 120.

13

Figures 34, 35:
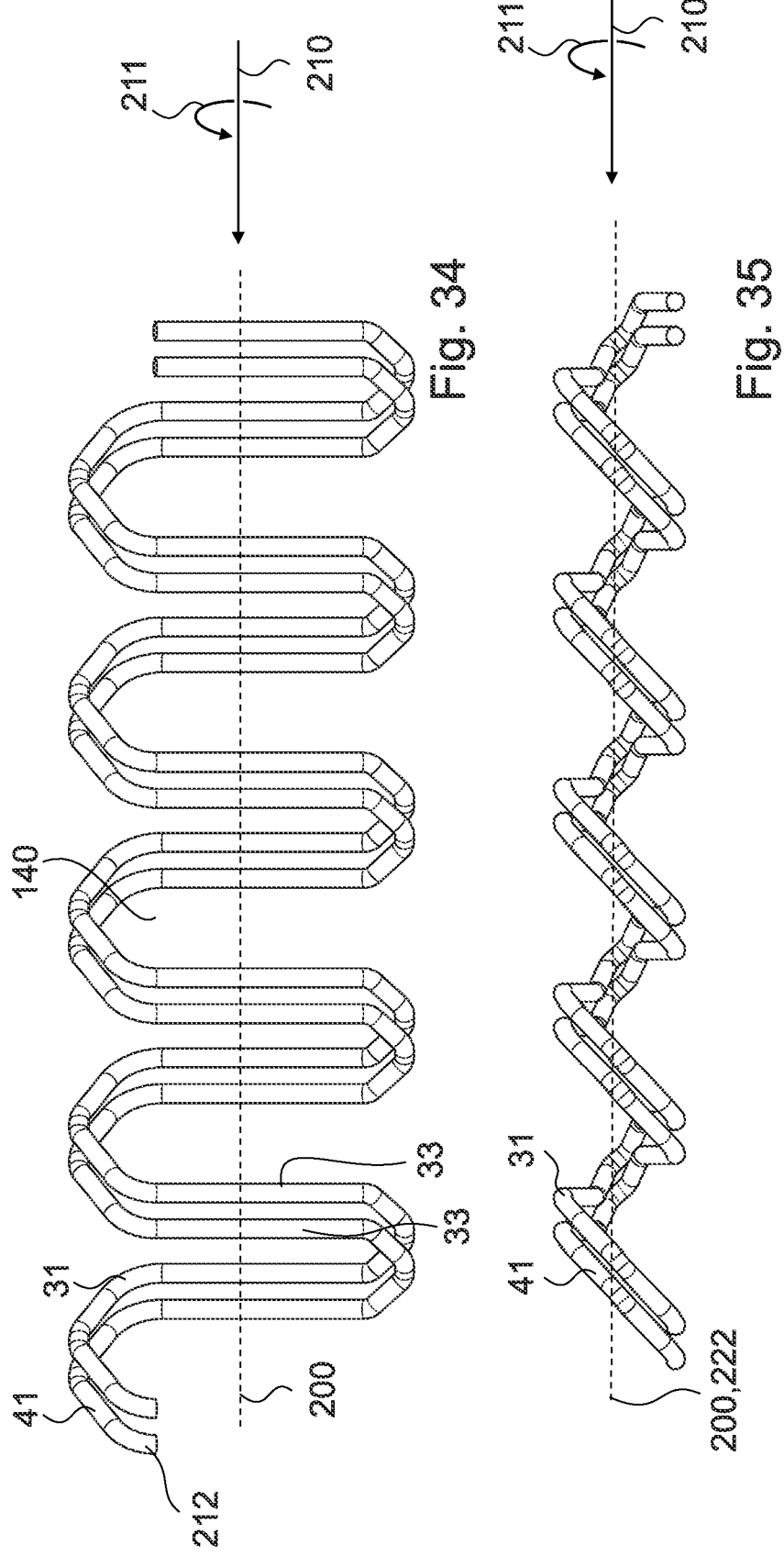
FIG. 34: shows two conductor elements connected to one another in a view from the side.
FIG. 35: shows the two conductor elements connected with one another in plan view.

The braid is now created by providing a further conductor 41 which has been pre-formed in essentially the same way as the first conductor 31. As indicated in FIGS. 34 and 35, the further conductor 41 is then moved relative to the first conductor 31 with a combination movement, which combines a translatory movement component 210 with a rotary movement component 211, so that the further conductor 41 rotates about the longitudinal axis 200 thereof and is simultaneously moved forward along the longitudinal axis 200 so that the conductor tip 212 thereof penetrates through the shaft of the first conductor 31 in each case. As a result, the further conductor 41 meanders through the meshes 140 of the first conductor 31, in a similar manner to the production of a wire mesh fence, so that these result in a plurality of spatial spirals twisted into one another.

As can be seen from FIG. 34, the linear conductor sections 33 also overlap one another.

Figure 36:
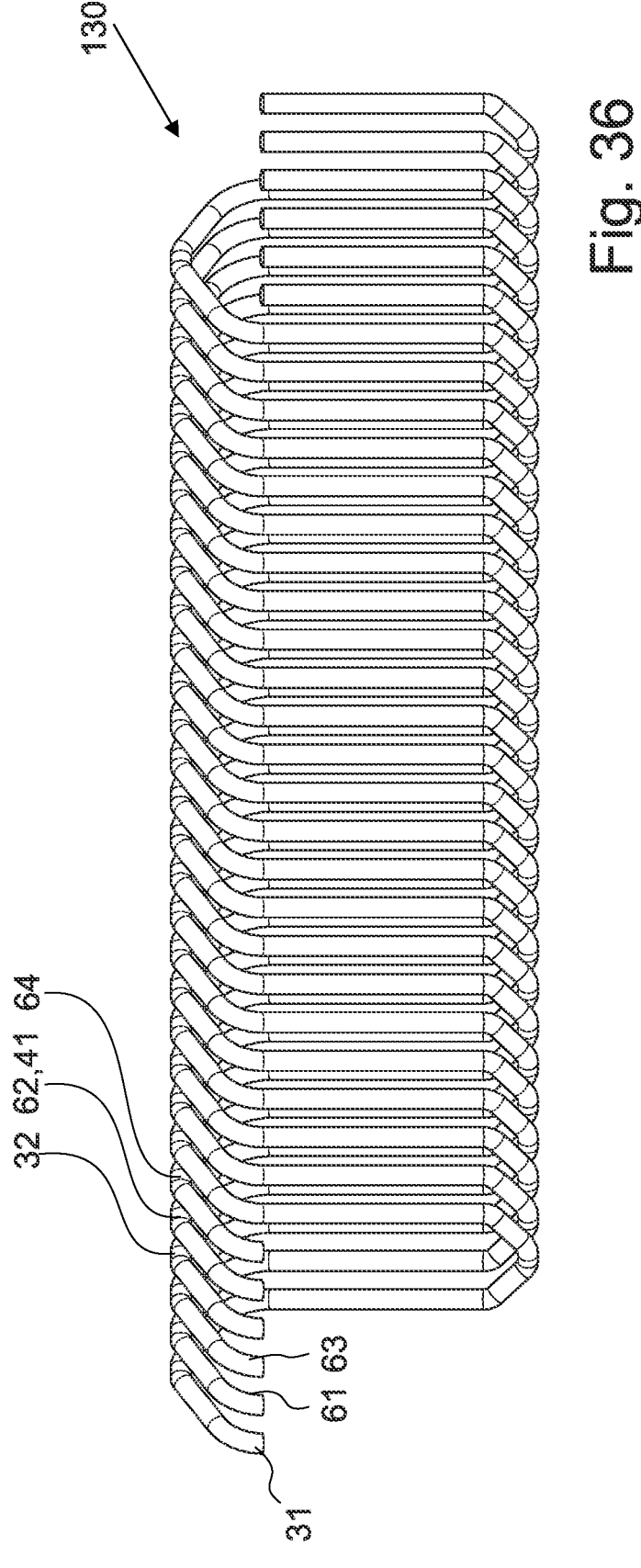
FIG. 36: shows the winding produced.

FIG. 36 shows a braid 130 formed from the first conductor 31, a second conductor 32, a third conductor 61, a fourth conductor 62, a fifth conductor 63, and a sixth conductor 64 which have been engaged into one another in accordance with the above procedure. The fourth conductor 62 and the first conductor 31 have been screwed into one another in the manner described. This means that the fourth conductor 62 corresponds to the further conductor 41.

The other conductors shown here, i.e., the second conductor 32, the third conductor 61, the fifth conductor 63 and the sixth conductor 64 have in turn been connected to one another according to the present method in the sequence shown.

Accordingly, this provides three pairs of conductors for connection to three phases that are intertwined.

Deviating from the embodiment shown here, of course, more or fewer pairs of conductors can be intertwined to connect the phases.

After the production of this braid 130, this braid 130 still must be bent into a circular shape. In addition, the three-dimensional structures of the individual conductors of this braid can also be reduced in the axial extent, so that they result in a flat mat that requires less axial space when integrated between the stator teeth.

Figures 37, 38:
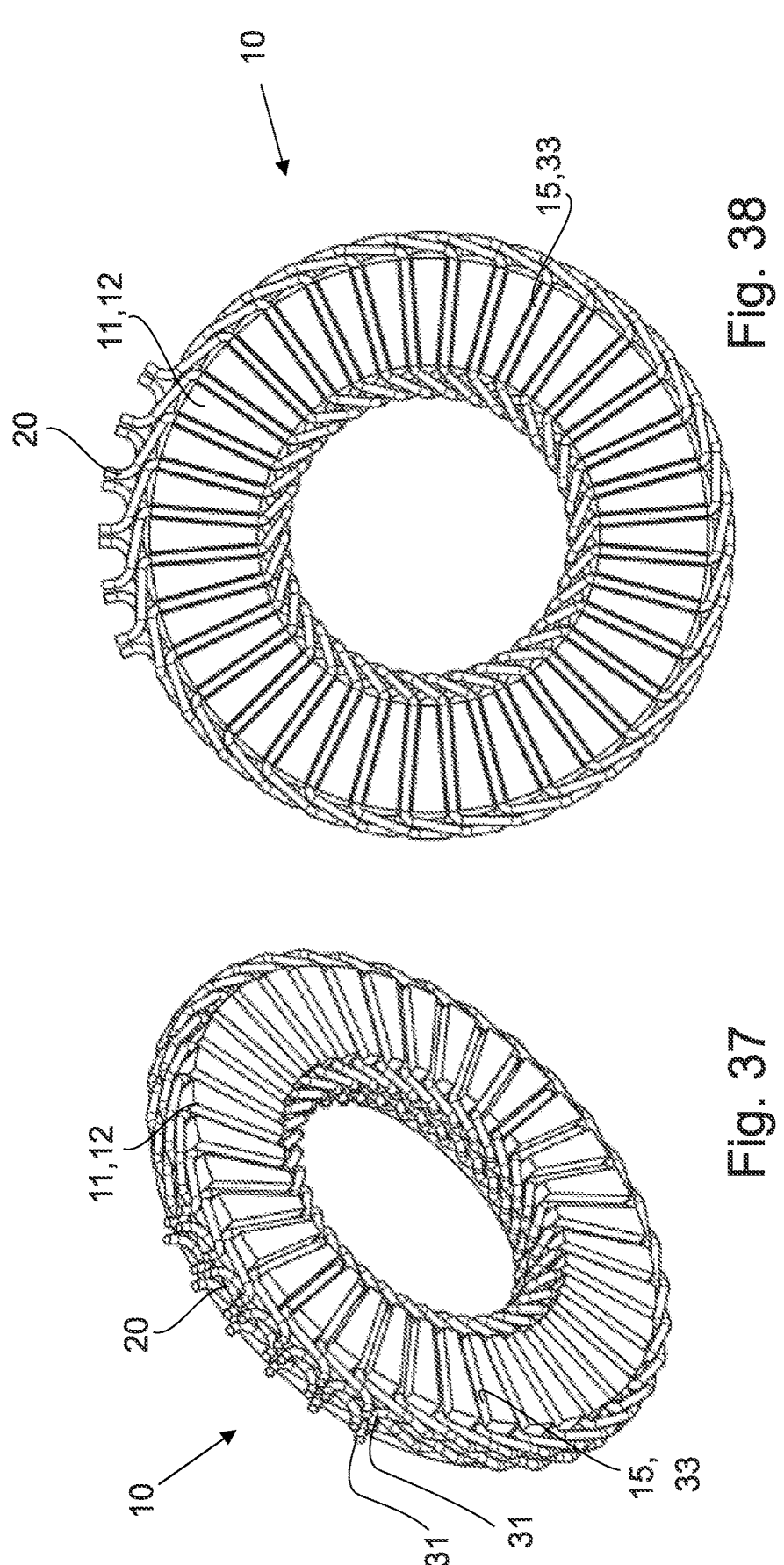
FIG. 37: shows a stator core with winding in a perspective view.
FIG. 38: shows a stator core with winding in a front view.

However, the method is not limited to the sequence of the individual steps described above. FIGS. 37 and 38 each show a stator 10 in the grooves 15 of which are arranged the linear conductor sections 33 of a braid made of the six conductors mentioned above.

The stator 10 shown here has the special feature that it comprises the six conductors in two double layers, which, however, are not connected to one another by transition sections, as shown in FIG. 5. This is evident from the designation of two first conductors 31 in FIG. 37, for example.

With the method for producing a winding for a stator of an electric rotating machine, and with the stator itself, the method for producing the stator, and with the electric rotating machine, solutions are made available that allow the winding and accordingly also the stator having the winding, and the electric rotating machine comprising the stator at low cost and with little effort, especially for windings in which a conductor is routed in more than two planes.

LIST OF REFERENCE SYMBOLS

1 Axial flux machine
2 Rotor
10 Stator
11 Stator body

14

12 Stator tooth
13 Group of stator teeth
14 Circumferential direction
15 Groove
16 Depth of groove
20 Winding
21 Winding direction
22 Winding head
30 Conductor pair
31 First conductor
32 Second conductor
33 Linear conductor section
34 Enlacing
35 Connecting conductor section
36 First connection of the positive conductor
37 Second connection of the positive conductor
38 First connection of the negative conductor
39 Second connection of the negative conductor
40 Common connection region
41 Further conductor
51 First plane
52 Second plane
53 Third plane
54 Fourth plane
60 Double layer
61 Third conductor
62 Fourth conductor
63 Fifth conductor
64 Sixth conductor
70 Transition section
71 Positive connections
72 Connection for series connection
73 Connection for star connection
80 First fin
81 Longitudinal axis
82 First winding direction
90 Second fin
91 Second winding direction
92 Enlacing angle
100 Third fin
110 First enlacing side
111 Second enlacing side
112 Flat side surface
120 Extreme value range
130 Braid
140 Mesh
200 Longitudinal axis of the second conductor
210 Translatory movement component
211 Rotary movement component
212 Conductor tips
220 Positive slope section
221 Negative slope section
222 Center plane
230 First distance
231 Second distance

The invention claimed is:

1. A stator of an electric rotating machine, comprising:
a stator body having a plurality of stator teeth arranged along a circumferential direction and grooves formed between the stator teeth; and
conductor sections of conductors of a winding, arranged in the grooves wherein the conductors of the winding are assigned to different electrical phases, and wherein only one respective phase is arranged for at least one conductor section of at least one conductor in a respective groove, and the sequence of arrangement of parallel conductor sections in each groove through which the conductors pass alternates along the circumferential direction, and wherein the conductors deviate from a winding direction running basically in the circumferential direction to meander in a first plane in a radial direction in a direction running substantially perpendicular to the circumferential direction and in a second plane perpendicular to the first plane, and with a respective enlacing formed thereby enlacing a respective group of stator teeth;

wherein the conductors include a first conductor and a further conductor, and the further conductor is wound around an extreme value axis of the first conductor, which runs through regions of the first conductor, which regions form extreme values.

2. An electric rotating machine, comprising a rotor and at least one stator according to claim 1.

3. The electric rotating machine according to claim 2, wherein the conductors of each of the phases are connected in a star connection to corresponding contacts carrying current of the relevant phase.

4. The stator of claim 1, wherein the conductors have a zigzag shape at least in length portions, wherein the zigzag shape is three-dimensional, and corresponds to a harmonic oscillation, and wherein linear conductor sections of the conductors having a positive slope and linear conductor sections of the conductors having a negative slope are each arranged on both sides outside of a central plane running through regions of the extreme values.

5. The stator of claim 4, wherein the zigzag shape is configured between adjacent linear conductor sections alternately a first distance and a second distance, wherein the first distance is greater than the second distance.

\*     \*     \*     \*     \*